US012322932B2

(12) United States Patent
Skuci et al.

(10) Patent No.: US 12,322,932 B2
(45) Date of Patent: Jun. 3, 2025

(54) INTERLOCK SYSTEM FOR A LOW, MEDIUM OR HIGH VOLTAGE SWITCHGEAR

(71) Applicant: ABB Schweiz AG, Baden (CH)

(72) Inventors: Michal Skuci, Brno (CZ); Josef Cernohous, Jamne nad Orlici (CZ)

(73) Assignee: ABB Schweiz AG, Baden (CH)

( * ) Notice: Subject to any disclaimer, the term of this patent is extended or adjusted under 35 U.S.C. 154(b) by 805 days.

(21) Appl. No.: 17/391,053

(22) Filed: Aug. 2, 2021

(65) Prior Publication Data
US 2022/0052512 A1  Feb. 17, 2022

(30) Foreign Application Priority Data

Aug. 12, 2020 (EP) .................................... 20190733

(51) Int. Cl.
*H02B 1/38* (2006.01)
*H02B 1/052* (2006.01)
*H02B 11/28* (2006.01)

(52) U.S. Cl.
CPC ............. *H02B 1/38* (2013.01); *H02B 1/0526* (2013.01); *H02B 11/28* (2013.01)

(58) Field of Classification Search
CPC ...... H02B 1/0526; H02B 1/38; H02B 11/133; H02B 11/28
See application file for complete search history.

(56) References Cited

U.S. PATENT DOCUMENTS

| 2008/0073188 | A1* | 3/2008 | Emura | ...................... H01H 9/22 200/50.12 |
| 2010/0236905 | A1* | 9/2010 | Capelli | ................ H02B 11/127 200/50.24 |
| 2016/0126028 | A1* | 5/2016 | Mun | .................... H02B 11/133 200/50.12 |

FOREIGN PATENT DOCUMENTS

| BE | 535860 A | 12/1958 |
| CN | 1031002 A | 2/1989 |
| CN | 109586200 A | 4/2019 |
| EP | 0540073 A2 | 5/1993 |
| EP | 2230734 A1 | 9/2010 |
| EP | 3016223 A1 | 5/2016 |
| KR | 100957493 B1 | 5/2010 |
| WO | WO 2013/076048 A1 | 5/2013 |

* cited by examiner

OTHER PUBLICATIONS

The Patent Office of the People's Republic of China, Office Action in Chinese Patent Application No. 202110921023.6, 10 pp. (Apr. 16, 2024).

*Primary Examiner* — Timothy J Thompson
*Assistant Examiner* — Rhadames Alonzo Miller
(74) *Attorney, Agent, or Firm* — Leydig, Voit & Mayer, Ltd.

(57) ABSTRACT

An interlock system for a low, medium or high voltage switchgear includes: a compartment; a door; a door handle; and a circuit breaker. The door permits access to an inside of the compartment. The door handle opens and closes the door. The circuit breaker is located in the compartment. The door handle is movable from a closed position to an open position. When the door handle is in the closed position, the door does not to open, and when the door handle is in the open position, the door opens. A movement of the door handle from the closed position to the open position places the circuit breaker in a locked configuration. In the locked configuration the circuit breaker is not operable.

14 Claims, 21 Drawing Sheets

INTERLOCK SYSTEM FOR A LOW, MEDIUM OR HIGH VOLTAGE SWITCHGEAR

CROSS-REFERENCE TO PRIOR APPLICATION

Priority is claimed to European Patent Application No. EP 20 190 733.4, filed on Aug. 12, 2020, the entire disclosure of which is hereby incorporated by reference herein.

FIELD

The present invention relates to interlock systems for low, medium or high voltage switchgear, and to low, medium or high voltage switchgears.

BACKGROUND

The operation of low, Medium and high voltage switchgear has to follow certain rules so that the safety of both the device and the operator is secured. This often involves the use of interlocks.

Interlocks can operate in mechanical, an electrical or in a combined mechanical and electrical way. Mechanical interlocks are often preferred, because they work without the need of electrical power and their status can easily be overviewed by an operator.

However, there is the possibility for interlocks to be overridden, either through the use of excessive force being used by the operator or through the operator intentionally seeking to override the interlock.

There is a need to provide low. Medium and high voltage switchgear with improved interlock systems.

SUMMARY

In an embodiment, the present invention provides an interlock system for a low, medium or high voltage switchgear, comprising: a compartment; a door; a door handle; and a circuit breaker, wherein the door is configured to permit access to an inside of the compartment, wherein the door handle is configured to open and close the door, wherein the circuit breaker is located in the compartment, wherein the door handle is configured to move from a closed position to an open position, wherein the interlock system is configured such that, when the door handle is in the closed position, the door is configured not to open, and when the door handle is in the open position, the door is configured to open, wherein a movement of the door handle from the closed position to the open position is configured to place the circuit breaker in a locked configuration, and wherein in the locked configuration the circuit breaker is not operable.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
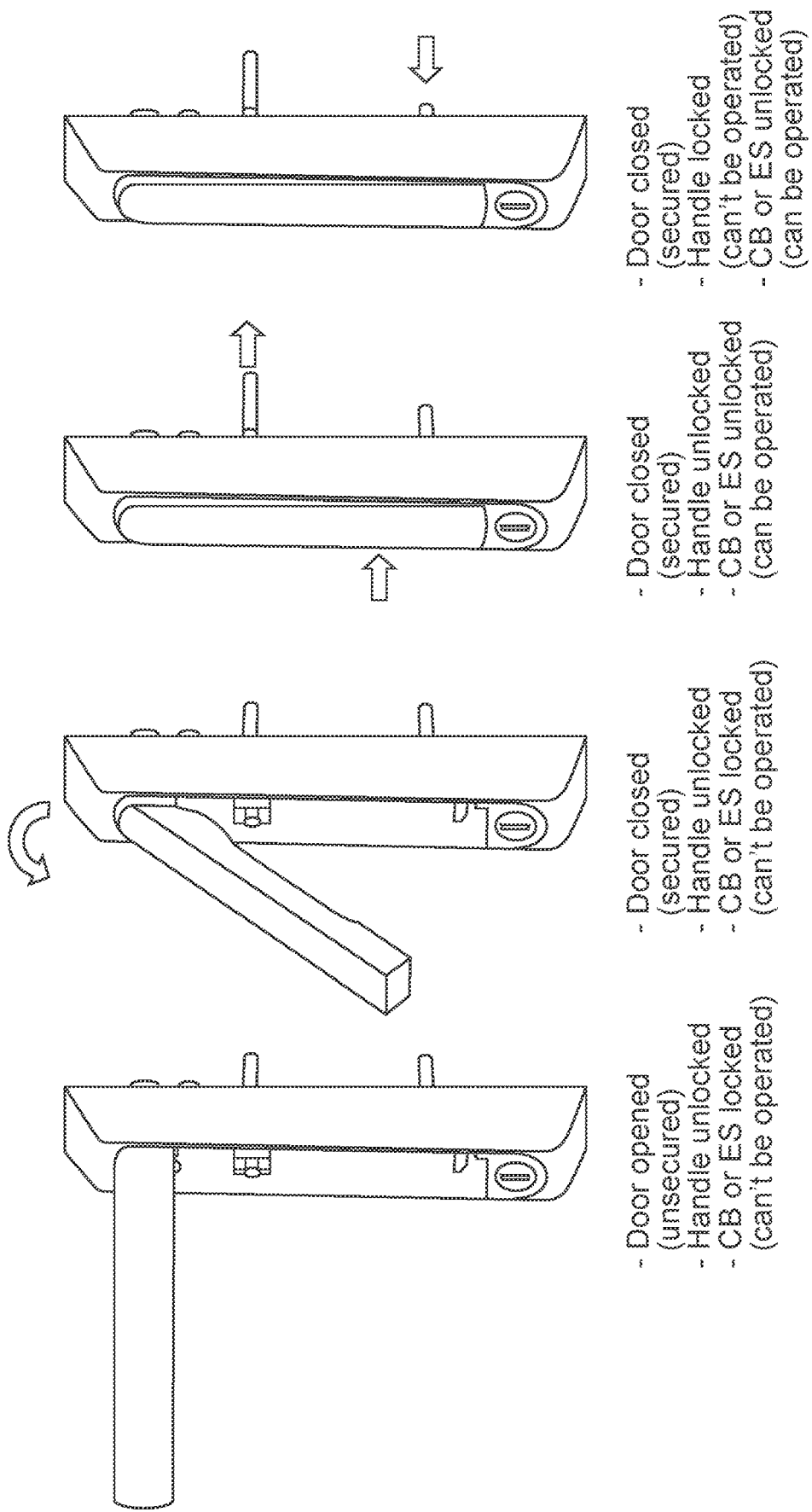
FIG. 1 shows an example of a handle that is part of the new interlock system.

In an embodiment, the present invention provides improved low, medium or high voltage switchgear interlock technology.

In a first aspect, there is provided an interlock system for a low, medium or high voltage switchgear, the switchgear comprising:
a compartment;
a door;
a door handle; and
a circuit breaker;
wherein, the door permits access to the inside of the compartment;
wherein the door handle is used to open and close the door;
wherein the circuit breaker is located in the compartment;
wherein the door handle is configured to move from a closed position to an open position; and
wherein the interlock system is configured such that:
when the door handle is in the closed position the door is configured not to open and when the door handle is in the open position the door is configured to open; and
wherein a movement of the door handle from the closed position to the open position is configured to place the circuit breaker in a locked configuration, and wherein in the locked configuration the circuit breaker cannot be operated.

In a second aspect, there is provided low, medium or high voltage switchgear, comprising:
a compartment;
a door;
a door handle; and
a circuit breaker.

The door permits access to the inside of the compartment. The door handle is used to open and close the door. The circuit breaker is located in the compartment. The door handle is configured to move from a closed position to an open position. A movement of the door handle from the closed position to the open position is configured to place the circuit breaker in a locked configuration. In the locked configuration the circuit breaker cannot be operated. When the door handle is in the closed position the door is configured not to open and when the door handle is in the open position the door is configured to open.

In an example, a movement of the door handle from the open position to the closed position is configured to place the circuit breaker in an unlocked configuration, and wherein in the unlocked configuration the circuit breaker can be operated.

In an example, when the door handle is in the closed position a movement of the circuit breaker from a racked out configuration to a racked in configuration is configured to place the door handle in a locked configuration where it is locked from moving from the closed position to the open position.

In an example, when the door handle is in the closed position a movement of the circuit breaker from the racked in configuration to the racked out configuration is configured to place the door handle in an unlocked configuration where it is not locked from moving from the closed position to the open position.

In an example, the switchgear comprises an earthing switch and an earthing switch operation handle or bar. When the earthing switch operation handle or bar is inserted the earthing switch is configured to not operate and when the earthing switch operation handle or bar is not inserted the earthing switch is configured to operate. A movement of the circuit breaker from a racked in configuration to a racked out configuration is configured to de-activate a lock, and de-activation of the lock is configured to enable the earthing switch operation handle or bar to be inserted.

In an example, insertion of the earthing switch operation handle or bar is configured to place the circuit breaker in the locked configuration.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration. In the unlocked configuration the circuit breaker can be operated.

In an example, the switchgear comprises: a second compartment; a second door; and a second door handle. The second door permits access to the inside of the second compartment. The second door handle is used to open and close the second door. The second door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. When the second door handle is in the closed position the second door is configured not to open and when the second door handle is in the open position the second door is configured to open. When the second door handle is in the closed position a transition of the earthing switch from the on state to the off state is configured to place the second door handle in a locked configuration where it is locked from moving from the closed position to the open position.

In a third aspect, there is provided an interlock system for a low, medium or high voltage switchgear, the switchgear comprising:
  a compartment;
  a door;
  a door handle; and
  a circuit breaker;
  wherein, the door permits access to the inside of the compartment;
  wherein the door handle is used to open and close the door;
  wherein the circuit breaker is located in the compartment;
  wherein the door handle is configured to move from a closed position to an open position; and
  wherein the interlock system is configured such that:
    when the door handle is in the closed position the door is configured not to open and when the door handle is in the open position the door is configured to open; and
    wherein when the door handle is in the closed position a movement of the circuit breaker from a racked out configuration to a racked in configuration is configured to place the door handle in a locked configuration where it is locked from moving from the closed position to the open position.

In a fourth aspect, there is provided a low, medium or high voltage switchgear, comprising:
  a compartment;
  a door;
  a door handle; and
  a circuit breaker.

The door permits access to the inside of the compartment. The door handle is used to open and close the door. The circuit breaker is located in the compartment. The door handle is configured to move from a closed position to an open position. When the door handle is in the closed position a movement of the circuit breaker from a racked out configuration to a racked in configuration is configured to place the door handle in a locked configuration where it is locked from moving from the closed position to the open position. When the door handle is in the closed position the door is configured not to open and when the door handle is in the open position the door is configured to open.

In an example, when the door handle is in the closed position a movement of the circuit breaker from the racked in configuration to the racked out configuration is configured to place the door handle in an unlocked configuration where it is not locked from moving from the closed position to the open position.

In an example, a movement of the door handle from the closed position to the open position is configured to place the circuit breaker in a locked configuration, and in the locked configuration the circuit breaker cannot be operated.

In an example, a movement of the door handle from the open position to the closed position is configured to place the circuit breaker in an unlocked configuration, and in the unlocked configuration the circuit breaker can be operated.

In an example, the switchgear comprises an earthing switch and an earthing switch operation handle or bar. When the earthing switch operation handle or bar is inserted the earthing switch is configured to not operate and when the earthing switch operation handle or bar is not inserted the earthing switch is configured to operate. A movement of the circuit breaker from a racked in configuration to a racked out configuration is configured to de-activate a lock, and de-activation of the lock is configured to enable the earthing switch operation handle or bar to be inserted.

In an example, insertion of the earthing switch operation handle or bar is configured to place the circuit breaker in a locked configuration, and in the locked configuration the circuit breaker cannot be operated.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration. In the unlocked configuration the circuit breaker can be operated.

In an example, the switchgear comprises: a second compartment; a second door; and a second door handle. The second door permits access to the inside of the second compartment. The second door handle is used to open and close the second door. The second door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. When the second door handle is in the closed position the second door is configured not to open and when the second door handle is in the open position the second door is configured to open. When the second door handle is in the closed position a transition of the earthing switch from the on state to the off state is configured to place the second door handle in a locked configuration where it is locked from moving from the closed position to the open position.

In a fifth aspect, there is provided an interlock system for a low, medium or high voltage switchgear, the switchgear comprising:
- a compartment;
- a circuit breaker;
- an earthing switch; and
- an earthing switch operation handle or bar;
- wherein the circuit breaker is located in the compartment; and
- wherein the interlock system is configured such that:
  - when the earthing switch operation handle or bar is inserted the earthing switch is configured not to operate and when the earthing switch operation handle or bar is not inserted the earthing switch is configured to operate;
  - wherein a movement of the circuit breaker from a racked in configuration to a racked out configuration is configured to de-activate a lock; and
  - wherein de-activation of the lock is configured to enable the earthing switch operation handle or bar to be inserted.

In a sixth aspect, there is provided a low, medium or high voltage switchgear, comprising:
- a compartment;
- a circuit breaker;
- an earthing switch; and
- an earthing switch operation handle or bar.

The circuit breaker is located in the compartment. When the earthing switch operation handle or bar is inserted the earthing switch is configured not to operate and when the earthing switch operation handle or bar is not inserted the earthing switch is configured to operate. A movement of the circuit breaker from a racked in configuration to a racked out configuration is configured to de-activate a lock. De-activation of the lock is configured to enable the earthing switch operation handle or bar to be inserted.

In an example, insertion of the earthing switch operation handle or bar is configured to place the circuit breaker in a locked configuration, and wherein in the locked configuration the circuit breaker cannot be operated.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration. In the unlocked configuration the circuit breaker can be operated.

In an example, the switchgear comprises a door and a door handle. The door permits access to the inside of the compartment. The door handle is used to open and close the door. The door handle is configured to move from a closed position to an open position. A movement from the closed position to the open position is configured to place the circuit breaker in a locked configuration. In the locked configuration the circuit breaker cannot be operated. When the door handle is in the closed position the door is configured not to open and when the door handle is in the open position the door is configured to open.

In an example, a movement of the door handle from the open position to the closed position is configured to place the circuit breaker in an unlocked configuration, and in the unlocked configuration the circuit breaker can be operated.

In an example, when the door handle is in the closed position a movement of the circuit breaker from the racked out configuration to the racked in configuration is configured to place the door handle in a locked configuration where it is locked from moving from the closed position to the open position.

In an example, when the door handle is in the closed position a movement of the circuit breaker from the racked in configuration to the racked out configuration is configured to place the door handle in an unlocked configuration where it is not locked from moving from the closed position to the open position.

In a seventh aspect, there is provided an interlock system for a low, medium or high voltage switchgear, the switchgear comprising:
- a compartment;
- a door;
- a door handle;
- an earthing switch; and
- an earthing switch operation handle or bar;
- wherein, the door permits access to the inside of the compartment;
- wherein the door handle is used to open and close the door;
- wherein the door handle is configured to move from a closed position to an open position;
- wherein the earthing switch is configured to be transitioned to an on state through utilization of the earthing switch operation handle or bar and the earthing switch is configured to be transitioned to an off state through utilization of the earthing switch operation handle or bar; and
- wherein the interlock system is configured such that:
  - when the door handle is in the closed position the door is configured not to open and when the door handle is in the open position the door is configured to open; and
  - wherein when the door handle is in the closed position a transition of the earthing switch from the on state to the off state is configured to place the door handle in a locked configuration where it is locked from moving from the closed position to the open position.

In an eighth aspect, there is provided a low, medium or high voltage switchgear, comprising:
- a compartment;
- a door;
- a door handle;
- an earthing switch; and
- an earthing switch operation handle or bar.

The door permits access to the inside of the compartment. The door handle is used to open and close the door. The door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. When the door handle is in the closed position the door is configured not to open and when the door handle is in the open position the door is configured to open. When the door handle is in the closed position a transition of the earthing switch from the on state to the off state is configured to place the door handle in a locked configuration where it is locked from moving from the closed position to the open position.

In an example, when the door handle is in the closed position a transition of the earthing switch from the off state to the on state is configured to place the door handle in an unlocked configuration where it is not locked from moving from the closed position to the open position.

In an example, a rotation of the earthing switch operation handle or bar is configured to transition the earthing switch from the on state to the off state. An off-centred bearing or cam of the earthing switch operation handle or bar is configured to convert the rotation of the earthing switch operation handle or bar to a translational movement of a part of a coupling system. The coupling system is configured to engage with the door handle to place the door handle in the locked configuration.

In an example, the switchgear comprises: a second compartment; a second door; a second door handle; and a circuit breaker. The second door permits access to the inside of the second compartment. The second door handle is used to open and close the second door. The circuit breaker is located in the second compartment. The second door handle is configured to move from a closed position to an open position. A movement from the closed position to the open position of the door handle is configured to place the circuit breaker in a locked configuration. In the locked configuration the circuit breaker cannot be operated. When the second door handle is in the closed position the second door is configured not to open and when the second door handle is in the open position the second door is configured to open.

In an example, when the earthing switch operation handle or bar is inserted the earthing switch is configured not to operate and when the earthing switch operation handle or bar is not inserted the earthing switch is configured to operate. A movement of the circuit breaker from a racked in configuration to a racked out configuration is configured to de-activate a lock. De-activation of the lock is configured to enable the earthing switch operation handle or bar to be inserted.

In an example, insertion of the earthing switch operation handle or bar is configured to place the circuit breaker in the locked configuration.

The above aspects and examples will become apparent from and be elucidated with reference to the embodiments described hereinafter.

FIGS. 1-21 relate to an integrated interlock system for a low, medium or high voltage switchgear with a number of different interlock system functionalities, and to one or more low, medium or high voltage switchgear having one or more of the parts of the integrated interlock system.

An example of an interlock system for a low, medium or high voltage switchgear is described below. The switchgear comprises a compartment, a door, a door handle, and a circuit breaker. Thus, in this example the compartment is a circuit breaker compartment. The door permits access to the inside of the compartment. The door handle is used to open and close the door. The circuit breaker is located in the compartment. The door handle is configured to move from a closed position to an open position. The interlock system is configured such that:

when the door handle is in the closed position the door is configured not to open and when the door handle is in the open position the door is configured to open; and
a movement of the door handle from the closed position to the open position is configured to place the circuit breaker in a locked configuration, and wherein in the locked configuration the circuit breaker cannot be operated.

In an example, the movement of the door handle from the closed position to the open position is configured to move a part of a coupling system away from a body portion of the door handle. When the part of the coupling system is moved away from the body portion of the door handle an interlock inside a circuit breaker truck is de-activated by the coupling system.

In an example, a movement of the door handle from the open position to the closed position is configured to place the circuit breaker in an unlocked configuration, and in the unlocked configuration the circuit breaker can be operated.

In an example, the movement of the door handle from the open position to the closed position is configured enable the part of the coupling system to move towards the body portion of the door handle. When the part of the coupling system is moved towards the body portion of the door handle the interlock inside the circuit breaker truck is activated by the coupling system.

In an example, a spring based system is configured to enable the part of the coupling system to move towards the body portion of the door handle.

In an example, when the door handle is in the closed position a movement of the circuit breaker from a racked out configuration to a racked in configuration is configured to place the door handle in a locked configuration where it is locked from moving from the closed position to the open position.

In an example, the movement of the circuit breaker from the racked out configuration to the racked in configuration is configured to move a part of a coupling system toward the body portion of the door handle. When the part of the coupling system is moved toward the body portion of the door handle it is configured to engage with the door handle to place the door handle in the locked configuration.

In an example, when the door handle is in the closed position a movement of the circuit breaker from the racked in configuration to the racked out configuration is configured to place the door handle in an unlocked configuration where it is not locked from moving from the closed position to the open position.

In an example, the movement of the circuit breaker from the racked in configuration to the racked out configuration is configured to move the part of the coupling system away from the body portion of the door handle. When the part of the coupling system is moved away from the body portion of the door handle it is configured to dis-engage with the door handle to place the door handle in the unlocked configuration.

In an example, the switchgear comprises an earthing switch and an earthing switch operation handle or bar. The interlock system is configured such that:

when the earthing switch operation handle or bar is inserted the earthing switch is configured not to operate and when the earthing switch operation handle or bar is not inserted the earthing switch is configured to operate;
a movement of the circuit breaker from a racked in configuration to a racked out configuration is configured to de-activate a lock, and
de-activation of the lock is configured to enable the earthing switch operation handle or bar to be inserted.

In an example, insertion of the earthing switch operation handle or bar is configured to place the circuit breaker in the locked configuration.

In an example, insertion of the earthing switch operation handle or bar is configured to move a part of a coupling system that moves a locking flap that is configured to stop the circuit breaker from moving and place the circuit breaker in the locked configuration.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration, and in the unlocked configuration the circuit breaker can be operated.

In an example, the switchgear comprises a second compartment, a second door, and a second door handle. Thus, the second compartment can for example be a cable connection compartment. The second door permits access to the inside of the second compartment. The second door handle is used to open and close the second door. The second door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. The interlock system is configured such that:

when the second door handle is in the closed position the second door is configured not to open and when the second door handle is in the open position the second door is configured to open; and when the second door handle is in the closed position a transition of the earthing switch from the on state to the off state is configured to place the second door handle in a locked configuration where it is locked from moving from the closed position to the open position.

In an example, the transition of the earthing switch from the on state to the off state is configured to move a part of a coupling system toward a body portion of the second door handle. When the part of the coupling system is moved toward the body portion of the second door handle it is configured to engage with the second door handle to place the second door handle in the locked configuration.

In an example, a spring based system is configured to enable the part of the coupling system to move towards the body portion of the second door handle.

In an example, when the second door handle is in the closed position a transition of the earthing switch from the off state to the on state is configured to place the second door handle in an unlocked configuration where it is not locked from moving from the closed position to the open position.

In an example, the transition of the earthing switch from the off state to the on state is configured to move the part of the coupling system away from the body portion of the second door handle. When the part of the coupling system is moved away from the body portion of the second door handle it is configured to dis-engage with the second door handle to place the second door handle in the unlocked configuration.

In an example, a rotation of the earthing switch operation handle or bar is configured to transition the earthing switch from the on state to the off state. An off-centred bearing or cam of the earthing switch operation handle or bar is configured to convert the rotation of the earthing switch operation handle or bar to a translational movement of a part of a coupling system. The coupling system is configured to engage with the second door handle to place the second door handle in the locked configuration.

Thus, such an interlock system can be retrofitted to an existing low, medium or high voltage switchgear is necessary.

A low, medium or high voltage switchgear can however be constructed from the start with the interlock system.

An example of such a low, medium or high voltage switchgear comprises a compartment, a door, a door handle, and a circuit breaker. The door permits access to the inside of the compartment. The door handle is used to open and close the door. The circuit breaker is located in the compartment. The door handle is configured to move from a closed position to an open position and a movement from the closed position to the open position is configured to place the circuit breaker in a locked configuration. In the locked configuration the circuit breaker cannot be operated. When the door handle is in the closed position the door is configured not to open and when the door handle is in the open position the door is configured to open.

In an example, the movement of the door handle from the closed position to the open position is configured to move a part of a coupling system away from a body portion of the door handle. When the part of the coupling system is moved away from the body portion of the door handle an interlock inside a circuit breaker truck is de-activated by the coupling system.

In an example, a movement of the door handle from the open position to the closed position is configured to place the circuit breaker in an unlocked configuration, and wherein in the unlocked configuration the circuit breaker can be operated.

In an example, the movement of the door handle from the open position to the closed position is configured enable the part of the coupling system to move towards the body portion of the door handle. When the part of the coupling system is moved towards the body portion of the door handle the interlock inside the circuit breaker truck is activated by the coupling system.

In an example, a spring based system is configured to enable the the part of the coupling system to move towards the body portion of the door handle.

In an example, when the door handle is in the closed position a movement of the circuit breaker from a racked out configuration to a racked in configuration is configured to place the door handle in a locked configuration where it is locked from moving from the closed position to the open position.

In an example, the movement of the circuit breaker from the racked out configuration to the racked in configuration is configured to move a part of a coupling system toward the body portion of the door handle. When the part of the coupling system is moved toward the body portion of the door handle it is configured to engage with the door handle to place the door handle in the locked configuration.

In an example, when the door handle is in the closed position a movement of the circuit breaker from the racked in configuration to the racked out configuration is configured to place the door handle in an unlocked configuration where it is not locked from moving from the closed position to the open position.

In an example, the movement of the circuit breaker from the racked in configuration to the racked out configuration is configured to move the part of the coupling system away from the body portion of the door handle. When the part of the coupling system is moved away from the body portion of the door handle it is configured to dis-engage with the door handle to place the door handle in the unlocked configuration.

In an example, the switchgear comprises an earthing switch and an earthing switch operation handle or bar. When the earthing switch operation handle or bar is inserted the earthing switch is configured not to operate and when the earthing switch operation handle or bar is not inserted the earthing switch is configured to operate. A movement of the circuit breaker from a racked in configuration to a racked out configuration is configured to de-activate a lock. De-activation of the lock is configured to enable the earthing switch operation handle or bar to be inserted.

In an example, insertion of the earthing switch operation handle or bar is configured to place the circuit breaker in the locked configuration.

In an example, insertion of the earthing switch operation handle or bar is configured to move a part of a coupling system that moves a locking flap that is configured to stop the circuit breaker from moving and place the circuit breaker in the locked configuration.

In an example, a movement of the circuit breaker from the racked out configuration to the racked in configuration is configured to activate the lock. Activation of the lock is configured to stop the earthing switch operation handle or bar from being inserted.

In an example, the movement of the circuit breaker from the racked out configuration to the racked in configuration is configured to place the circuit breaker in an unlocked configuration. In the unlocked configuration the circuit breaker can be operated.

In an example, the switchgear comprises a second compartment, a second door, and a second door handle. The second door permits access to the inside of the second compartment. The second door handle is used to open and close the second door. The second door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. When the second door handle is in the closed position the second door is configured not to open and when the second door handle is in the open position the second door is configured to open. When the second door handle is in the closed position a transition of the earthing switch from the on state to the off state is configured to place the second door handle in a locked configuration where it is locked from moving from the closed position to the open position.

In an example, the transition of the earthing switch from the on state to the off state is configured to move a part of a coupling system toward a body portion of the second door handle. When the part of the coupling system is moved toward the body portion of the second door handle it is configured to engage with the second door handle to place the second door handle in the locked configuration.

In an example, a spring based system is configured to enable the part of the coupling system to move towards the body portion of the second door handle.

In an example, when the second door handle is in the closed position a transition of the earthing switch from the off state to the on state is configured to place the second door handle in an unlocked configuration where it is not locked from moving from the closed position to the open position.

In an example, the transition of the earthing switch from the off state to the on state is configured to move the part of the coupling system away from the body portion of the second door handle. When the part of the coupling system is moved away from the body portion of the second door handle it is configured to dis-engage with the second door handle to place the second door handle in the unlocked configuration.

In an example, a rotation of the earthing switch operation handle or bar is configured to transition the earthing switch from the on state to the off state. An off-centred bearing or cam of the earthing switch operation handle or bar is configured to convert the rotation of the earthing switch operation handle or bar to a translational movement of a part of a coupling system. The coupling system is configured to engage with the second door handle to place the second door handle in the locked configuration.

An example of an interlock system for a low, medium or high voltage switchgear is described below. The switchgear comprises a compartment, a door, a door handle, and a circuit breaker. The door permits access to the inside of the compartment. The door handle is used to open and close the door. The circuit breaker is located in the compartment. Thus, in this example the compartment is a circuit breaker compartment. The door handle is configured to move from a closed position to an open position. The interlock system is configured such that:

when the door handle is in the closed position the door is configured not to open and when the door handle is in the open position the door is configured to open; and when the door handle is in the closed position a movement of the circuit breaker from a racked out configuration to a racked in configuration is configured to place the door handle in a locked configuration where it is locked from moving from the closed position to the open position.

In an example, the movement of the circuit breaker from the racked out configuration to the racked in configuration is configured to move a part of a coupling system toward the body portion of the door handle. When the part of the coupling system is moved toward the body portion of the door handle it is configured to engage with the door handle to place the door handle in the locked configuration.

In an example when the door handle is in the closed position a movement of the circuit breaker from the racked in configuration to the racked out configuration is configured to place the door handle in an unlocked configuration where it is not locked from moving from the closed position to the open position.

In an example, the movement of the circuit breaker from the racked in configuration to the racked out configuration is configured to move the part of the coupling system away from the body portion of the door handle. When the part of the coupling system is moved away from the body portion of the door handle it is configured to dis-engage with the door handle to place the door handle in the unlocked configuration.

In an example a movement of the door handle from the closed position to the open position is configured to place the circuit breaker in a locked configuration, and wherein in the locked configuration the circuit breaker cannot be operated.

In an example, the movement of the door handle from the closed position to the open position is configured to move a part of a coupling system away from a body portion of the door handle. When the part of the coupling system is moved away from the body portion of the door handle an interlock inside a circuit breaker truck is de-activated by the coupling system.

In an example a movement of the door handle from the open position to the closed position is configured to place the circuit breaker in an unlocked configuration, and in the unlocked configuration the circuit breaker can be operated.

In an example, the movement of the door handle from the open position to the closed position is configured enable the part of the coupling system to move towards the body portion of the door handle. When the part of the coupling system is moved towards the body portion of the door handle the interlock inside the circuit breaker truck is activated by the coupling system.

In an example, a spring based system is configured to enable the part of the coupling system to move towards the body portion of the door handle.

In an example the switchgear comprises an earthing switch and an earthing switch operation handle or bar. The interlock system is configured such that:

- when the earthing switch operation handle or bar is inserted the earthing switch is configured not to operate and when the earthing switch operation handle or bar is not inserted the earthing switch is configured to operate;
- a movement of the circuit breaker from a racked in configuration to a racked out configuration is configured to de-activate a lock; and
- de-activation of the lock is configured to enable the earthing switch operation handle or bar to be inserted.

In an example insertion of the earthing switch operation handle or bar is configured to place the circuit breaker in a locked configuration, and in the locked configuration the circuit breaker cannot be operated.

In an example, insertion of the earthing switch operation handle or bar is configured to move a part of a coupling system that moves a locking flap that is configured to stop the circuit breaker from moving and place the circuit breaker in the locked configuration.

In an example a movement of the circuit breaker from the racked out configuration to the racked in configuration is configured to activate the lock, and activation of the lock is configured to stop the earthing switch operation handle or bar from being inserted.

In an example the movement of the circuit breaker from the racked out configuration to the racked in configuration is configured to place the circuit breaker in an unlocked configuration, and in the unlocked configuration the circuit breaker can be operated.

In an example the switchgear comprises a second compartment, a second door, and a second door handle. The second door permits access to the inside of the second compartment. The second door handle is used to open and close the second door. The second compartment can for example be a cable connection compartment. The second door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. The interlock system is configured such that:

- when the second door handle is in the closed position the second door is configured not to open and when the second door handle is in the open position the second door is configured to open;
- when the second door handle is in the closed position a transition of the earthing switch from the on state to the off state is configured to place the second door handle in a locked configuration where it is locked from moving from the closed position to the open position.

In an example, the transition of the earthing switch from the on state to the off state is configured to move a part of a coupling system toward a body portion of the second door handle. When the part of the coupling system is moved toward the body portion of the second door handle it is configured to engage with the second door handle to place the second door handle in the locked configuration.

In an example, a spring based system is configured to enable the part of the coupling system to move towards the body portion of the second door handle.

In an example, when the second door handle is in the closed position a transition of the earthing switch from the off state to the on state is configured to place the second door handle in an unlocked configuration where it is not locked from moving from the closed position to the open position.

In an example, the transition of the earthing switch from the off state to the on state is configured to move the part of the coupling system away from the body portion of the second door handle. When the part of the coupling system is moved away from the body portion of the second door handle it is configured to dis-engage with the second door handle to place the second door handle in the unlocked configuration.

In an example, a rotation of the earthing switch operation handle or bar is configured to transition the earthing switch from the on state to the off state, wherein an off-centred bearing or cam of the earthing switch operation handle or bar is configured to convert the rotation of the earthing switch operation handle or bar to a translational movement of a part of a coupling system, and wherein the coupling system is configured to engage with the second door handle to place the second door handle in the locked configuration.

Thus, such an interlock system can be retrofitted to an existing low, medium or high voltage switchgear is necessary.

A low, medium or high voltage switchgear can however be constructed from the start with the interlock system.

An example of such a low, medium or high voltage switchgear comprises a compartment, a door, a door handle, and a circuit breaker. The door permits access to the inside of the compartment. The door handle is used to open and close the door. The circuit breaker is located in the compartment. The door handle is configured to move from a closed position to an open position. When the door handle is in the closed position a movement of the circuit breaker from a racked out configuration to a racked in configuration is configured to place the door handle in a locked configuration where it is locked from moving from the closed position to the open position. When the door handle is in the closed position the door is configured not to open and when the door handle is in the open position the door is configured to open.

In an example, the movement of the circuit breaker from the racked out configuration to the racked in configuration is configured to move a part of a coupling system toward the body portion of the door handle. When the part of the coupling system is moved toward the body portion of the door handle it is configured to engage with the door handle to place the door handle in the locked configuration.

In an example, when the door handle is in the closed position a movement of the circuit breaker from the racked in configuration to the racked out configuration is configured to place the door handle in an unlocked configuration where it is not locked from moving from the closed position to the open position.

In an example, the movement of the circuit breaker from the racked in configuration to the racked out configuration is configured to move the part of the coupling system away from the body portion of the door handle. When the part of the coupling system is moved away from the body portion of the door handle it is configured to dis-engage with the door handle to place the door handle in the unlocked configuration.

In an example, a movement of the door handle from the closed position to the open position is configured to place the circuit breaker in a locked configuration, and in the locked configuration the circuit breaker cannot be operated.

In an example, the movement of the door handle from the closed position to the open position is configured to move a part of a coupling system away from a body portion of the door handle. When the part of the coupling system is moved away from the body portion of the door handle an interlock inside a circuit breaker truck is de-activated by the coupling system.

In an example, a movement of the door handle from the open position to the closed position is configured to place the circuit breaker in an unlocked configuration, and in the unlocked configuration the circuit breaker can be operated.

In an example, the movement of the door handle from the open position to the closed position is configured enable the part of the coupling system to move towards the body portion of the door handle. When the part of the coupling system is moved towards the body portion of the door handle the interlock inside the circuit breaker truck is activated by the coupling system.

In an example, a spring based system is configured to enable the the part of the coupling system to move towards the body portion of the door handle.

In an example, the switchgear comprises an earthing switch and an earthing switch operation handle or bar. When the earthing switch operation handle or bar is inserted the earthing switch is configured not to operate and when the earthing switch operation handle or bar is not inserted the earthing switch is configured to operate. A movement of the circuit breaker from a racked in configuration to a racked out configuration is configured to de-activate a lock. De-activation of the lock is configured to enable the earthing switch operation handle or bar to be inserted.

In an example, insertion of the earthing switch operation handle or bar is configured to place the circuit breaker in a locked configuration, and in the locked configuration the circuit breaker cannot be operated.

In an example, insertion of the earthing switch operation handle or bar is configured to move a part of a coupling system that moves a locking flap that is configured to stop the circuit breaker from moving and place the circuit breaker in the locked configuration.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration, and in the unlocked configuration the circuit breaker can be operated.

In an example, the switchgear comprises a second compartment, a second door, and a second door handle. The second door permits access to the inside of the second compartment. The second door handle is used to open and close the second door. The second door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. When the second door handle is in the closed position the second door is configured not to open and when the second door handle is in the open position the second door is configured to open. When the second door handle is in the closed position a transition of the earthing switch from the on state to the off state is configured to place the second door handle in a locked configuration where it is locked from moving from the closed position to the open position.

In an example, the transition of the earthing switch from the on state to the off state is configured to move a part of a coupling system toward a body portion of the second door handle. When the part of the coupling system is moved toward the body portion of the second door handle it is configured to engage with the second door handle to place the second door handle in the locked configuration.

In an example, a spring based system is configured to enable the part of the coupling system to move towards the body portion of the second door handle.

In an example, when the second door handle is in the closed position a transition of the earthing switch from the off state to the on state is configured to place the second door handle in an unlocked configuration where it is not locked from moving from the closed position to the open position.

In an example, the transition of the earthing switch from the off state to the on state is configured to move the part of the coupling system away from the body portion of the second door handle. When the part of the coupling system is moved away from the body portion of the second door handle it is configured to dis-engage with the second door handle to place the second door handle in the unlocked configuration.

In an example, a rotation of the earthing switch operation handle or bar is configured to transition the earthing switch from the on state to the off state. An off-centred bearing or cam of the earthing switch operation handle or bar is configured to convert the rotation of the earthing switch operation handle or bar to a translational movement of a part of a coupling system. The coupling system is configured to engage with the second door handle to place the second door handle in the locked configuration.

An example of an interlock system for a low, medium or high voltage switchgear is described below. The switchgear comprises a compartment, a circuit breaker, an earthing switch, and an earthing switch operation handle or bar. The circuit breaker is located in the compartment. Thus, in this example the compartment is a circuit breaker compartment. The interlock system is configured such that:

when the earthing switch operation handle or bar is inserted the earthing switch is configured not to operate and when the earthing switch operation handle or bar is not inserted the earthing switch is configured to operate;

a movement of the circuit breaker from a racked in configuration to a racked out configuration is configured to de-activate a lock; and de-activation of the lock is configured to enable the earthing switch operation handle or bar to be inserted.

In an example, insertion of the earthing switch operation handle or bar is configured to place the circuit breaker in a locked configuration, and in the locked configuration the circuit breaker cannot be operated.

In an example, insertion of the earthing switch operation handle or bar is configured to move a part of a coupling system that moves a locking flap that is configured to stop the circuit breaker from moving and place the circuit breaker in the locked configuration.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration, and in the unlocked configuration the circuit breaker can be operated.

In an example, the switchgear comprises a door and a door handle. The door permits access to the inside of the compartment. The door handle is used to open and close the door. The door handle is configured to move from a closed position to an open position. The interlock system is configured such that:
  a movement of the handle from the closed position to the open position is configured to place the circuit breaker in a locked configuration;
  in the locked configuration the circuit breaker cannot be operated; and
  when the door handle is in the closed position the door is configured not to open and when the door handle is in the open position the door is configured to open.

In an example, a movement of the door handle from the open position to the closed position is configured to place the circuit breaker in an unlocked configuration, and wherein in the unlocked configuration the circuit breaker can be operated.

In an example, when the door handle is in the closed position a movement of the circuit breaker from the racked out configuration to the racked in configuration is configured to place the door handle in a locked configuration where it is locked from moving from the closed position to the open position.

In an example, when the door handle is in the closed position a movement of the circuit breaker from the racked in configuration to the racked out configuration is configured to place the door handle in an unlocked configuration where it is not locked from moving from the closed position to the open position.

Thus, such an interlock system can be retrofitted to an existing low, medium or high voltage switchgear is necessary.

A low, medium or high voltage switchgear can however be constructed from the start with the interlock system.

An example of such a low, medium or high voltage switchgear comprises a compartment, a circuit breaker, an earthing switch, and an earthing switch operation handle or bar. The circuit breaker is located in the compartment. When the earthing switch operation handle or bar is inserted the earthing switch is configured not to operate and when the earthing switch operation handle or bar is not inserted the earthing switch is configured to operate. A movement of the circuit breaker from a racked in configuration to a racked out configuration is configured to de-activate a lock. De-activation of the lock is configured to enable the earthing switch operation handle or bar to be inserted.

In an example, insertion of the earthing switch operation handle or bar is configured to place the circuit breaker in a locked configuration, and in the locked configuration the circuit breaker cannot be operated.

In an example, insertion of the earthing switch operation handle or bar is configured to move a part of a coupling system that moves a locking flap that is configured to stop the circuit breaker from moving and place the circuit breaker in the locked configuration.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration, and in the unlocked configuration the circuit breaker can be operated.

In an example, the switchgear comprises a door and a door handle. The door permits access to the inside of the compartment. The door handle is used to open and close the door. The door handle is configured to move from a closed position to an open position. A movement of the door handle from the closed position to the open position is configured to place the circuit breaker in a locked configuration. In the locked configuration the circuit breaker cannot be operated. When the door handle is in the closed position the door is configured not to open and when the door handle is in the open position the door is configured to open.

In an example, a movement of the door handle from the open position to the closed position is configured to place the circuit breaker in an unlocked configuration, and in the unlocked configuration the circuit breaker can be operated.

In an example, when the door handle is in the closed position a movement of the circuit breaker from the racked out configuration to the racked in configuration is configured to place the door handle in a locked configuration where it is locked from moving from the closed position to the open position.

In an example, when the door handle is in the closed position a movement of the circuit breaker from the racked in configuration to the racked out configuration is configured to place the door handle in an unlocked configuration where it is not locked from moving from the closed position to the open position.

An example of an interlock system for a low, medium or high voltage switchgear is described below. The switchgear comprises a compartment, a door, a door handle, an earthing switch, and an earthing switch operation handle or bar. The door permits access to the inside of the compartment. The compartment can for example be a cable connection compartment. The door handle is used to open and close the door. The door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. The interlock system is configured such that:
  when the door handle is in the closed position the door is configured not to open and when the door handle is in the open position the door is configured to open; and
  when the door handle is in the closed position a transition of the earthing switch from the on state to the off state is configured to place the door handle in a locked configuration where it is locked from moving from the closed position to the open position.

In an example, the transition of the earthing switch from the on state to the off state is configured to move a part of a coupling system toward a body portion of the door handle. When the part of the coupling system is moved toward the body portion of the door handle it is configured to engage with the door handle to place the door handle in the locked configuration.

In an example, a spring based system is configured to enable the part of the coupling system to move towards the body portion of the door handle.

In an example, when the door handle is in the closed position a transition of the earthing switch from the off state to the on state is configured to place the door handle in an unlocked configuration where it is not locked from moving from the closed position to the open position.

In an example, the transition of the earthing switch from the off state to the on state is configured to move the part of the coupling system away from a body portion of the door handle. When the part of the coupling system is moved away from the body portion of the door handle it is configured to dis-engage with the door handle to place the door handle in the unlocked configuration.

In an example, a rotation of the earthing switch operation handle or bar is configured to transition the earthing switch from the on state to the off state. An off-centred bearing or cam of the earthing switch operation handle or bar is configured to convert the rotation of the earthing switch operation handle or bar to a translational movement of a part of a coupling system. The coupling system is configured to engage with the door handle to place the door handle in the locked configuration.

In an example, the switchgear comprises a second compartment, a second door, a second door handle, and a circuit breaker. The second door permits access to the inside of the second compartment. The second door handle is used to open and close the second door. The circuit breaker is located in the second compartment. the second compartment can be a circuit breaker compartment. The second door handle is configured to move from a closed position to an open position. The interlock system is configured such that:
  a movement of the second door handle from the closed position to the open position is configured to place the circuit breaker in a locked configuration;
  in the locked configuration the circuit breaker cannot be operated; and
  when the second door handle is in the closed position the second door is configured not to open and when the second door handle is in the open position the second door is configured to open.

In an example, the movement of the second door handle from the closed position to the open position is configured to move a part of a coupling system away from a body portion of the second door handle. When the part of the coupling system is moved away from the body portion of the second door handle an interlock inside a circuit breaker truck is de-activated by the coupling system.

In an example, a movement of the second door handle from the open position to the closed position is configured to place the circuit breaker in an unlocked configuration, and in the unlocked configuration the circuit breaker can be operated.

In an example, the movement of the second door handle from the open position to the closed position is configured enable the part of the coupling system to move towards the body portion of the second door handle. When the part of the coupling system is moved towards the body portion of the second door handle the interlock inside the circuit breaker truck is activated by the coupling system.

In an example, a spring based system is configured to enable the part of the coupling system to move towards the body portion of the second door handle.

In an example, when the second door handle is in the closed position a movement of the circuit breaker from a racked out configuration to a racked in configuration is configured to place the second door handle in a locked configuration where it is locked from moving from the closed position to the open position.

In an example, the movement of the circuit breaker from the racked out configuration to the racked in configuration is configured to move a part of a coupling system toward the body portion of the second door handle. When the part of the coupling system is moved toward the body portion of the second door handle it is configured to engage with the second door handle to place the door handle in the locked configuration.

In an example, when the door handle is in the closed position a movement of the circuit breaker from the racked in configuration to the racked out configuration is configured to place the second door handle in an unlocked configuration where it is not locked from moving from the closed position to the open position.

In an example, the movement of the circuit breaker from the racked in configuration to the racked out configuration is configured to move the part of the coupling system away from the body portion of the second door handle. When the part of the coupling system is moved away from the body portion of the second door handle it is configured to dis-engage with the door handle to place the door handle in the unlocked configuration.

In an example, when the earthing switch operation handle or bar is inserted the earthing switch is configured not to operate and when the earthing switch operation handle or bar is not inserted the earthing switch is configured to operate. A movement of the circuit breaker from a racked in configuration to a racked out configuration is configured to de-activate a lock, and de-activation of the lock is configured to enable the earthing switch operation handle or bar to be inserted.

In an example, insertion of the earthing switch operation handle or bar is configured to place the circuit breaker in the locked configuration.

In an example, insertion of the earthing switch operation handle or bar is configured to move a part of a coupling system that moves a locking flap that is configured to stop the circuit breaker from moving and place the circuit breaker in the locked configuration.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration, and in the unlocked configuration the circuit breaker can be operated.

Thus, such an interlock system can be retrofitted to an existing low, medium or high voltage switchgear is necessary.

A low, medium or high voltage switchgear can however be constructed from the start with the interlock system.

An example of such a low, medium or high voltage switchgear comprises a compartment, a door, a door handle, an earthing switch, and an earthing switch operation handle or bar. The door permits access to the inside of the compartment. The door handle is used to open and close the door. The door handle is configured to move from a closed position to an open position. The earthing switch is configured to be transitioned to an on state through utilization of the earthing switch operation handle or bar and the earthing switch is configured to be transitioned to an off state through utilization of the earthing switch operation handle or bar. When the door handle is in the closed position the door is configured not to open and when the door handle is in the open position the door is configured to open. When the door handle is in the closed position a transition of the earthing switch from the on state to the off state is configured to place the door handle in a locked configuration where it is locked from moving from the closed position to the open position.

In an example, the transition of the earthing switch from the on state to the off state is configured to move a part of a coupling system toward a body portion of the door handle. When the part of the coupling system is moved toward the body portion of the door handle it is configured to engage with the door handle to place the door handle in the locked configuration.

In an example, a spring based system is configured to enable the part of the coupling system to move towards the body portion of the door handle.

In an example, when the door handle is in the closed position a transition of the earthing switch from the off state to the on state is configured to place the door handle in an unlocked configuration where it is not locked from moving from the closed position to the open position.

In an example, the transition of the earthing switch from the off state to the on state is configured to move the part of the coupling system away from a body portion of the door handle. When the part of the coupling system is moved away from the body portion of the door handle it is configured to dis-engage with the door handle to place the door handle in the unlocked configuration.

In an example, a rotation of the earthing switch operation handle or bar is configured to transition the earthing switch from the on state to the off state. An off-centred bearing or cam of the earthing switch operation handle or bar is configured to convert the rotation of the earthing switch operation handle or bar to a translational movement of a part of a coupling system. The coupling system is configured to engage with the door handle to place the door handle in the locked configuration.

In an example, the switchgear comprises a second compartment, a second door, a second door handle, and a circuit breaker. The second door permits access to the inside of the second compartment. The second door handle is used to open and close the second door. The circuit breaker is located in the second compartment. The second door handle is configured to move from a closed position to an open position and a movement from the closed position to the open position is configured to place the circuit breaker in a locked configuration. In the locked configuration the circuit breaker cannot be operated. When the second door handle is in the closed position the second door is configured not to open and when the second door handle is in the open position the second door is configured to open.

In an example, the movement of the second door handle from the closed position to the open position is configured to move a part of a coupling system away from a body portion of the second door handle. When the part of the coupling system is moved away from the body portion of the second door handle an interlock inside a circuit breaker truck is de-activated by the coupling system.

In an example, a movement of the second door handle from the open position to the closed position is configured to place the circuit breaker in an unlocked configuration, and in the unlocked configuration the circuit breaker can be operated.

In an example, the movement of the second door handle from the open position to the closed position is configured enable the part of the coupling system to move towards the body portion of the second door handle. When the part of the coupling system is moved towards the body portion of the second door handle the interlock inside the circuit breaker truck is activated by the coupling system.

In an example, a spring based system is configured to enable the the part of the coupling system to move towards the body portion of the second door handle.

In an example, when the second door handle is in the closed position a movement of the circuit breaker from a racked out configuration to a racked in configuration is configured to place the second door handle in a locked configuration where it is locked from moving from the closed position to the open position.

In an example, the movement of the circuit breaker from the racked out configuration to the racked in configuration is configured to move a part of a coupling system toward the body portion of the second door handle. When the part of the coupling system is moved toward the body portion of the second door handle it is configured to engage with the second door handle to place the door handle in the locked configuration.

In an example, when the door handle is in the closed position a movement of the circuit breaker from the racked in configuration to the racked out configuration is configured to place the second door handle in an unlocked configuration where it is not locked from moving from the closed position to the open position.

In an example, the movement of the circuit breaker from the racked in configuration to the racked out configuration is configured to move the part of the coupling system away from the body portion of the second door handle. When the part of the coupling system is moved away from the body portion of the second door handle it is configured to dis-engage with the door handle to place the door handle in the unlocked configuration.

In an example, when the earthing switch operation handle or bar is inserted the earthing switch is configured not to operate and when the earthing switch operation handle or bar is not inserted the earthing switch is configured to operate. A movement of the circuit breaker from a racked in configuration to a racked out configuration is configured to de-activate a lock. De-activation of the lock is configured to enable the earthing switch operation handle or bar to be inserted.

In an example, insertion of the earthing switch operation handle or bar is configured to place the circuit breaker in the locked configuration.

In an example, insertion of the earthing switch operation handle or bar is configured to move a part of a coupling system that moves a locking flap that is configured to stop the circuit breaker from moving and place the circuit breaker in the locked configuration.

In an example, a movement of the circuit breaker from the racked out configuration to the racked in configuration is configured to activate the lock, and activation of the lock is configured to stop the earthing switch operation handle or bar from being inserted.

In an example, the movement of the circuit breaker from the racked out configuration to the racked in configuration is configured to place the circuit breaker in an unlocked configuration, and in the unlocked configuration the circuit breaker can be operated.

The interlock system has been described with respect to a low, medium or high voltage switchgear, but finds utility in other situations where access to compartments needs to be controlled, for example for control gear.

The interlock system for a low, medium or high voltage switchgear and a low, medium or high voltage switchgear having such an integrated interlock system as discussed in further details, where again reference is made to the figures.

FIG. 1 shows an example of the handle used in the new interlocking system. The left-hand figure shows the handle having been operated to open the door to the compartment. The door is therefore unsecured, and the handle is unlocked. However, the interlock system has ensured that the circuit breaker (CB) or earthing switch (ES) are locked and can't be operated. The second figure from the left is indicative of the door having been closed (secured), however the handle is in an un-closed and unlocked state. Again, the interlock system has ensured that the circuit breaker or earthing switch are locked and can't be operated. In the third from left figure, the handle is in a closed state but has not yet been locked. The circuit breaker or a switch have now been placed in unlocked states by the interlock system, and can be operated. As shown in the figure closing of the handle activated a pushrod connected to a coupling system of the interlock system that led to the circuit breaker or earthing switch becoming unlocked, and where they can be activated or operated. The right-hand figure, shows the handle in the closed state but now the handle has been locked and cannot be opened. What has occurred is that an active element within the switchgear has entered a state that could be considered dangerous, for example a circuit breaker has been racked to a position where it can now operate, and this has activated a coupling system which has led to a pushrod being pushed into the handle and that has then locked the handle.

Thus the individual figures of FIG. 1 show the stages of handle operation. The interlocking system has in effect separated the motion of closing and securing the door against internal arc and the unlocking the interlock. The interlocking system takes information from handle and only after the door is properly secured (today interlocking takes information only from door position itself—not connected to the handle in any way). Another feature of the new interlocking and new safety handle is that the interlocking system blocks opening of the door by blocking the handle and not the door itself.

Figure 2:
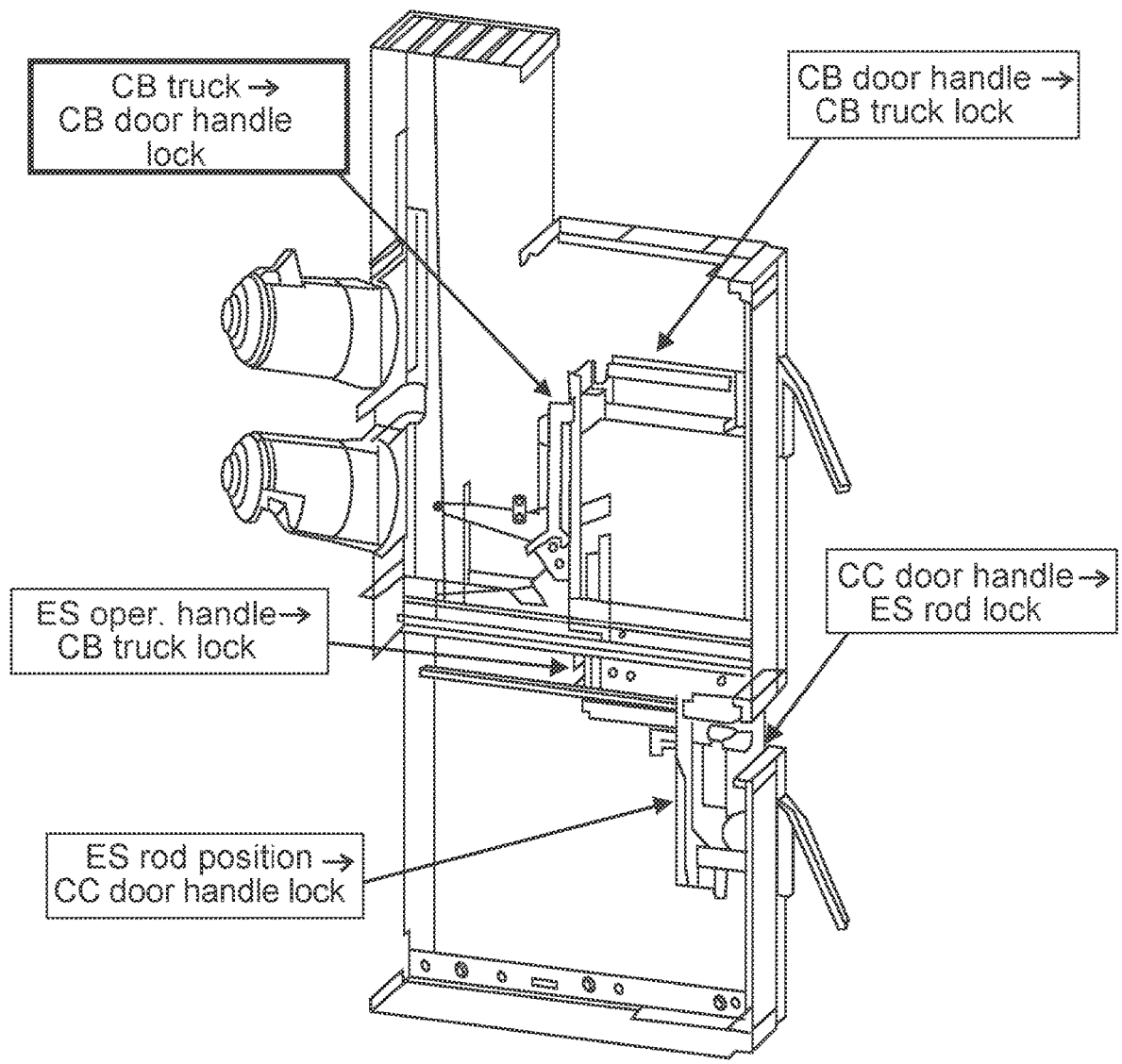
FIG. 2 shows an example of a switchgear with an exemplar integrated interlock system.

FIG. 2 shows a complete interlock system within a switchgear.

Figure 3:
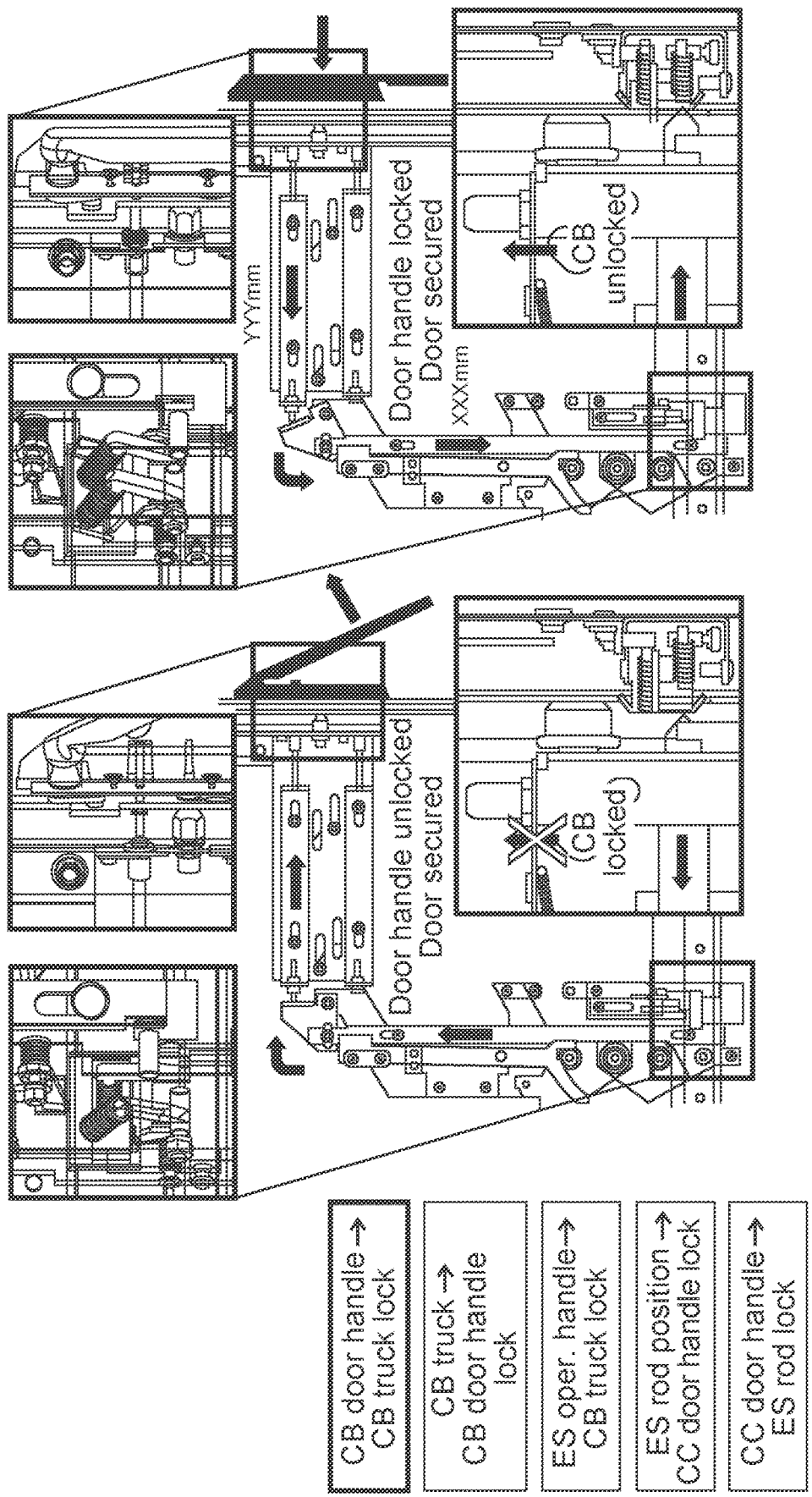
FIG. 3-8 shows examples of an interlock system associated with a circuit breaker.
Figure 4:
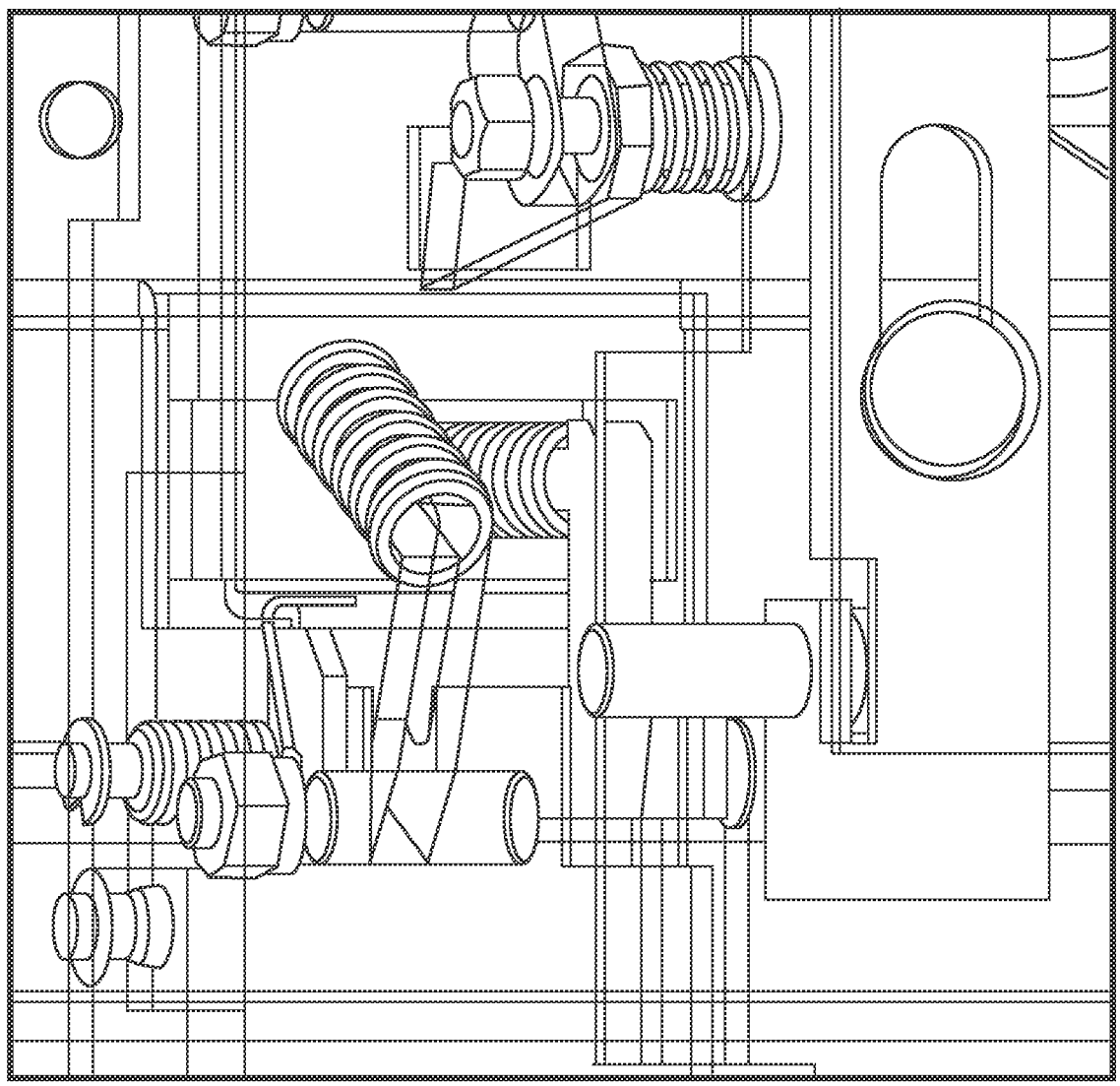
Figure 5:
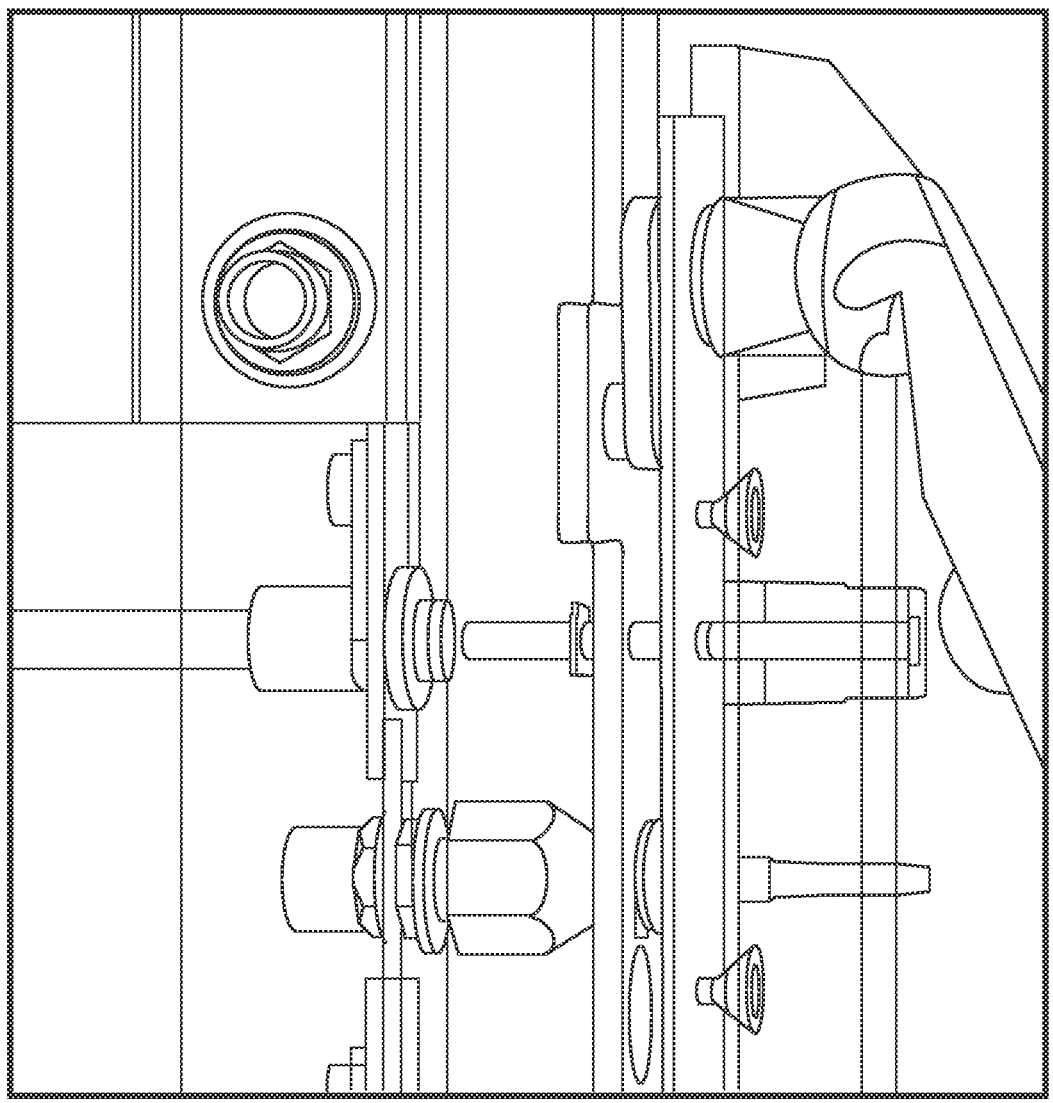
Figure 6:
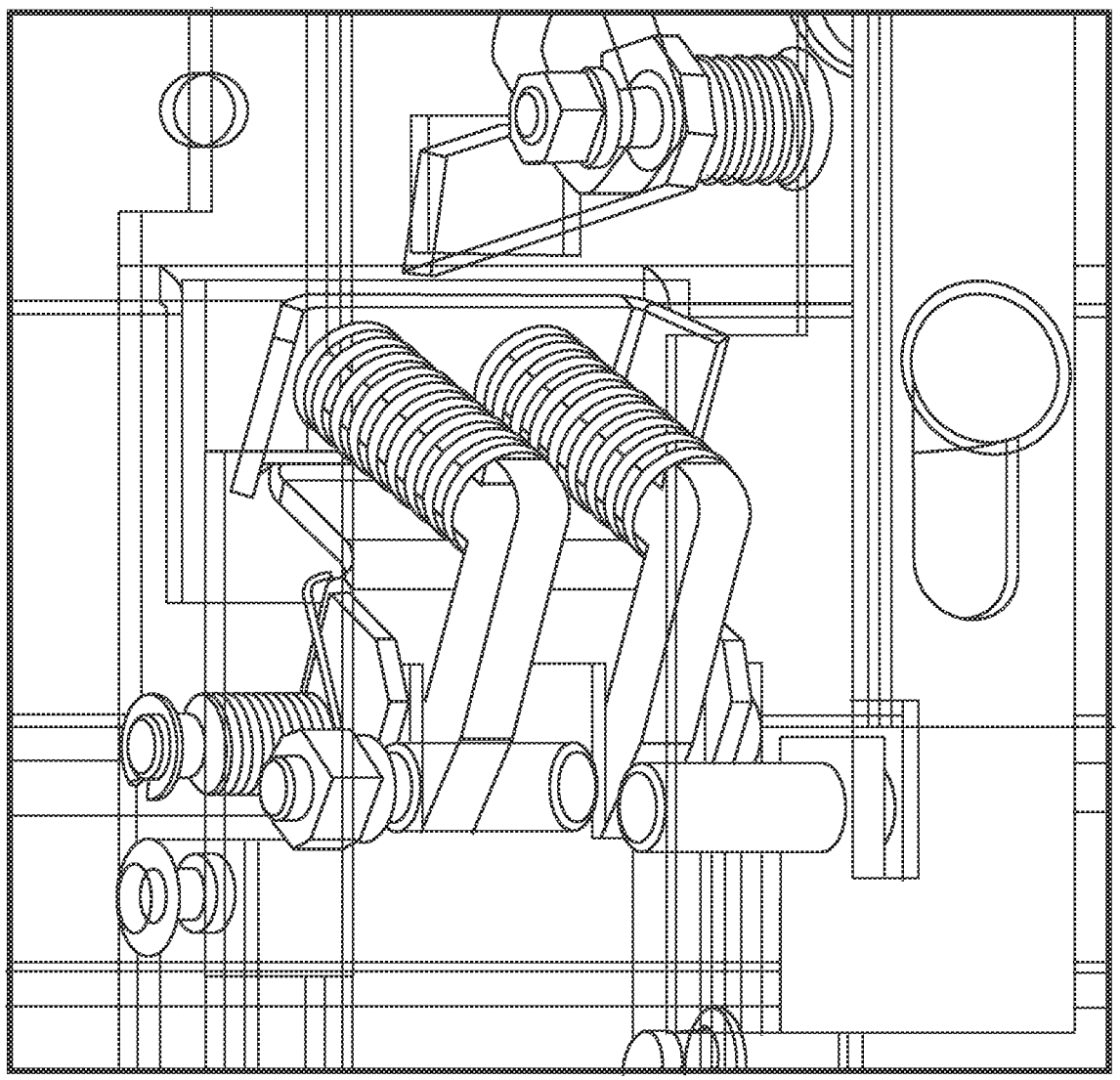
Figure 7:
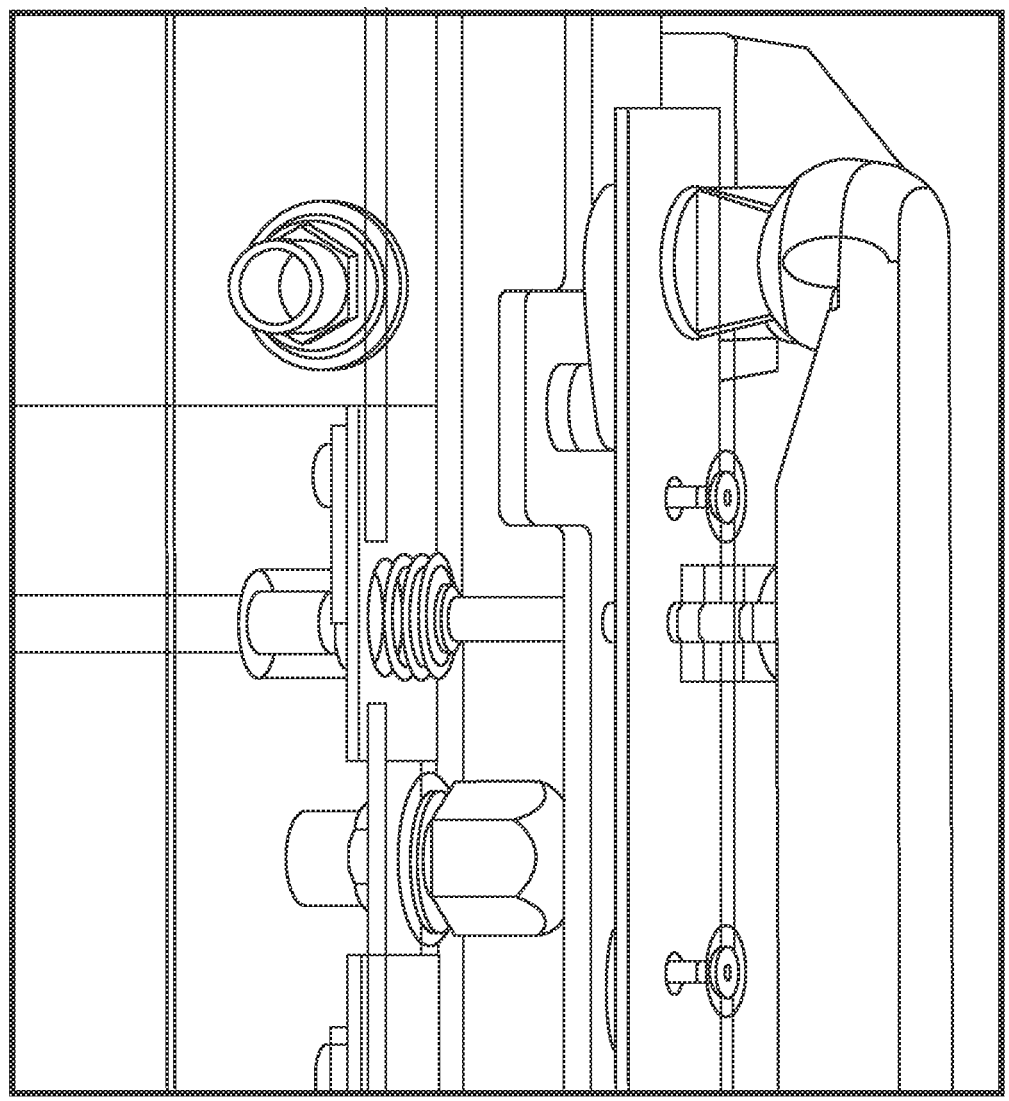

FIGS. 3-7 shows motion of the interlocking system for locking and unlocking the CB. FIG. 3 is an overall figure, with FIGS. 4-7 showing expanded portions of regions highlighted in FIG. 3, and in effect shows the interaction between the CB door handle and the CB truck lock. If the handle is "clicked in" the pin inside the handle pushes a horizontal slider. This motion is transferred downwards in the figures, which releases a locking flap that deactivates/activates an already existing interlock inside the CB truck. If the handle is "clicked out" a vertical slider that is under a spring will move up and move the locking flap out and lock the CB truck.

Figure 8:
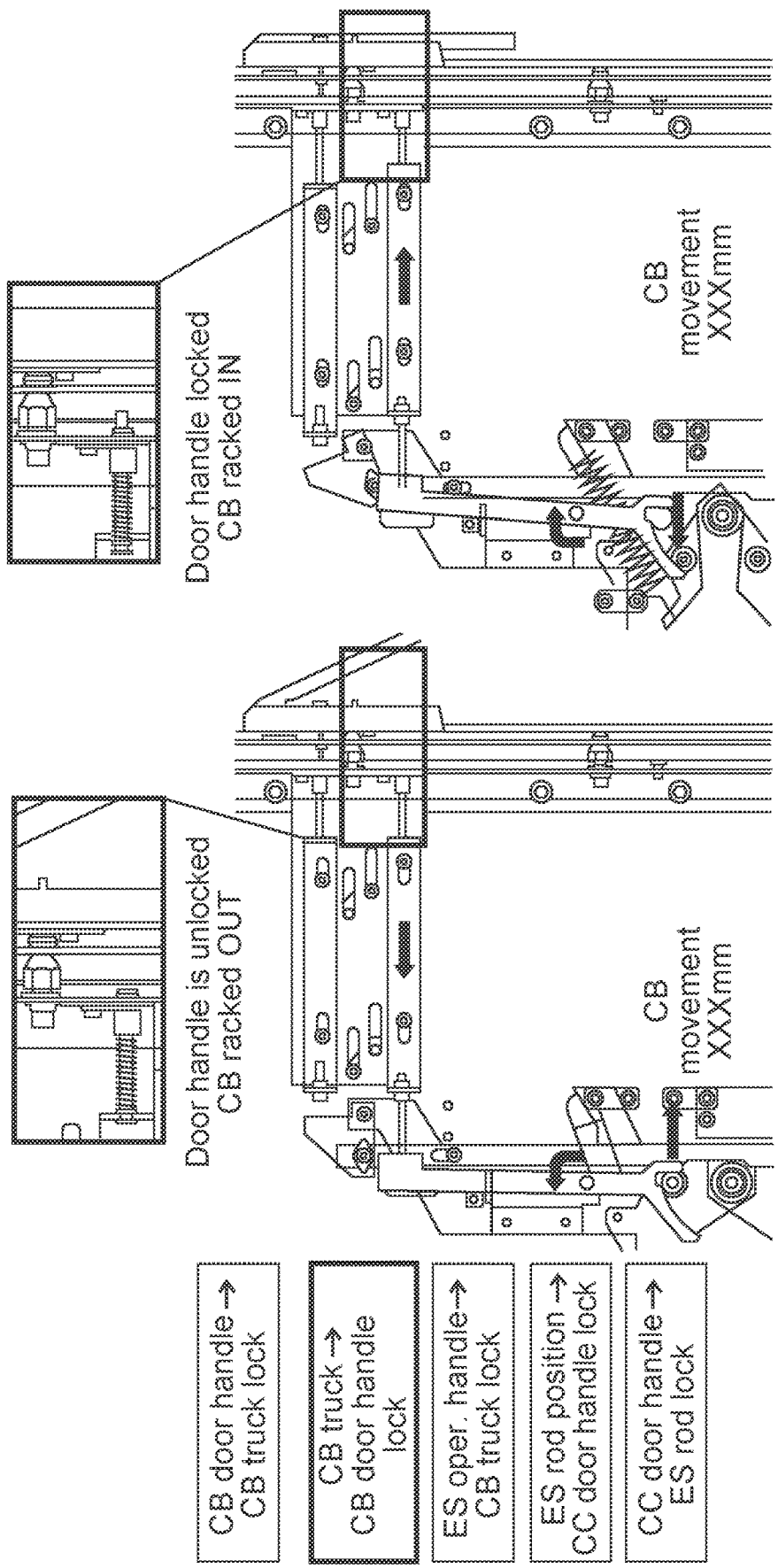

FIG. 8 shows the motion to lock the handle to lock the door, and in effect shows the interaction between the CB truck and the CB door handle lock. Inward CB motion rotates the lever which pushes the slider out which locks the handle. Outward movement of CB in the opposite direction releases the handle so it can be clicked out and the door can be opened.

Figure 9:
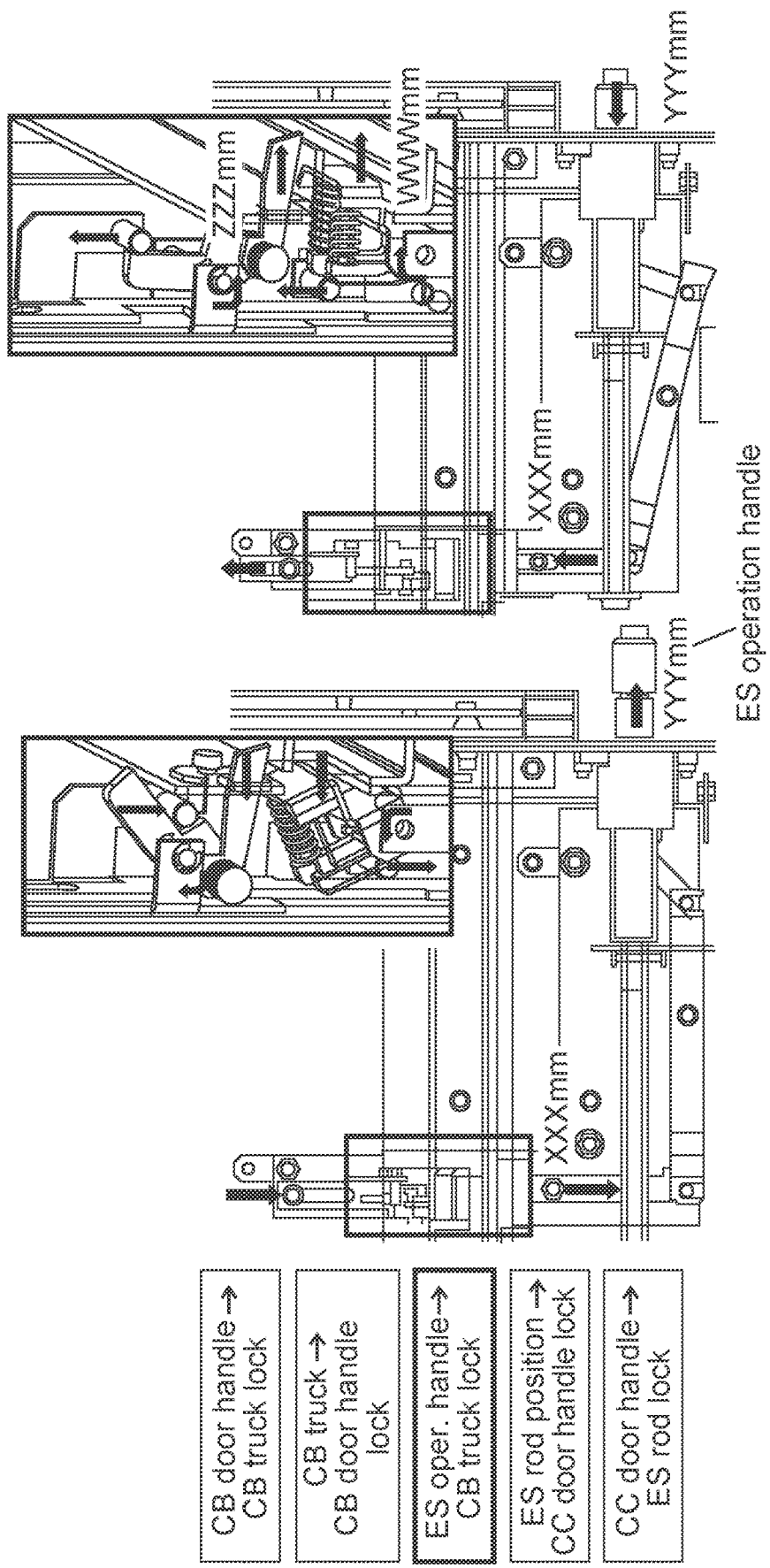
FIGS. 9-21 shows example of an interlock system associated with an earthing switch.
Figure 10:
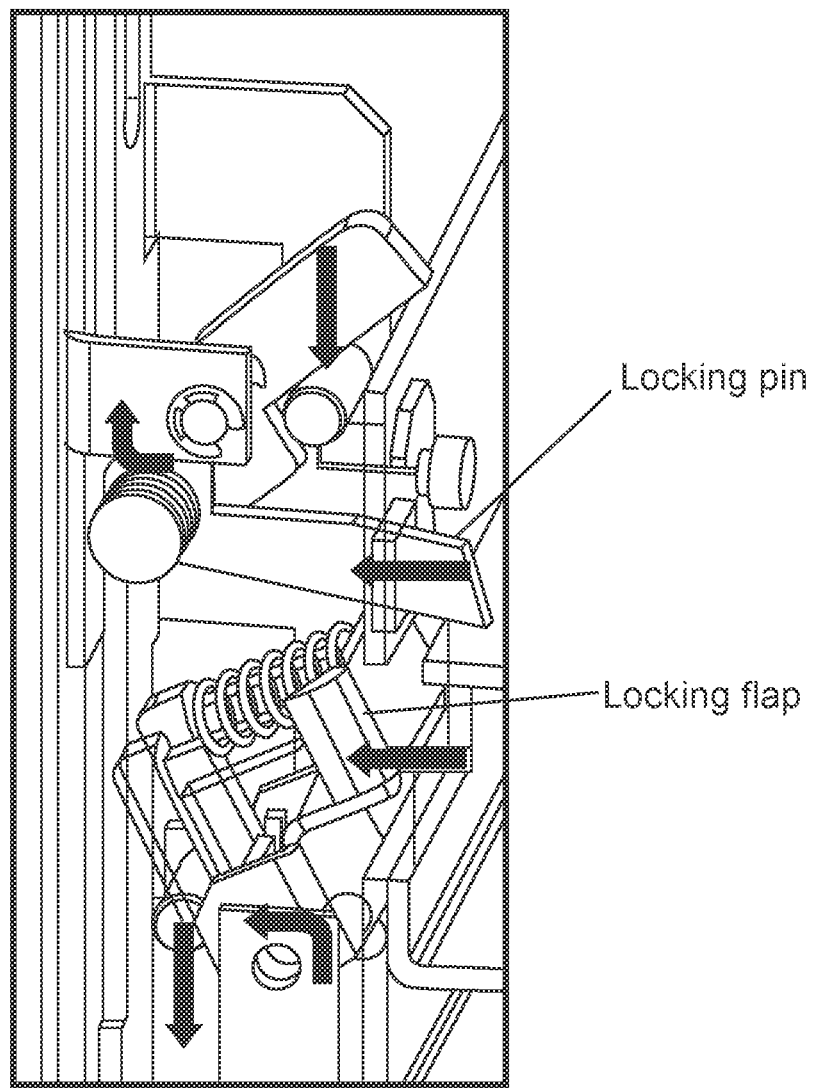
Figure 11:
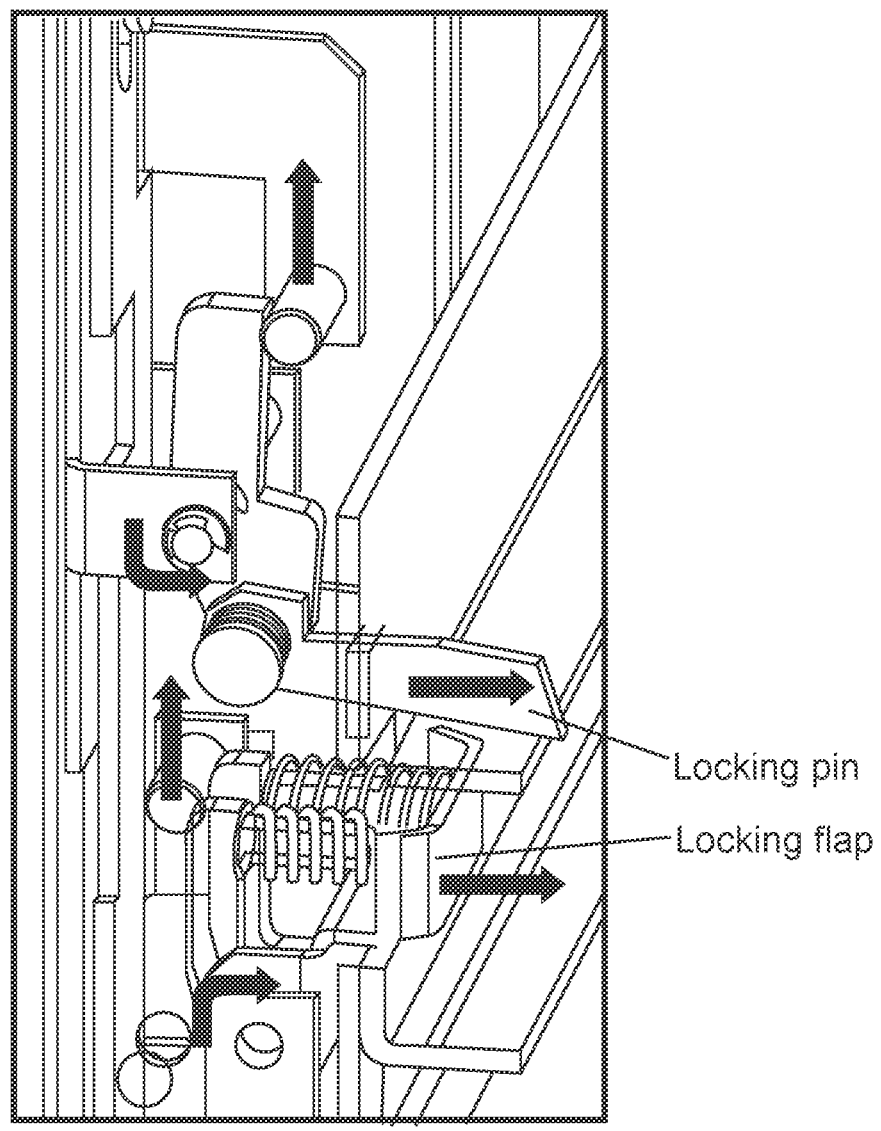
Figure 12:
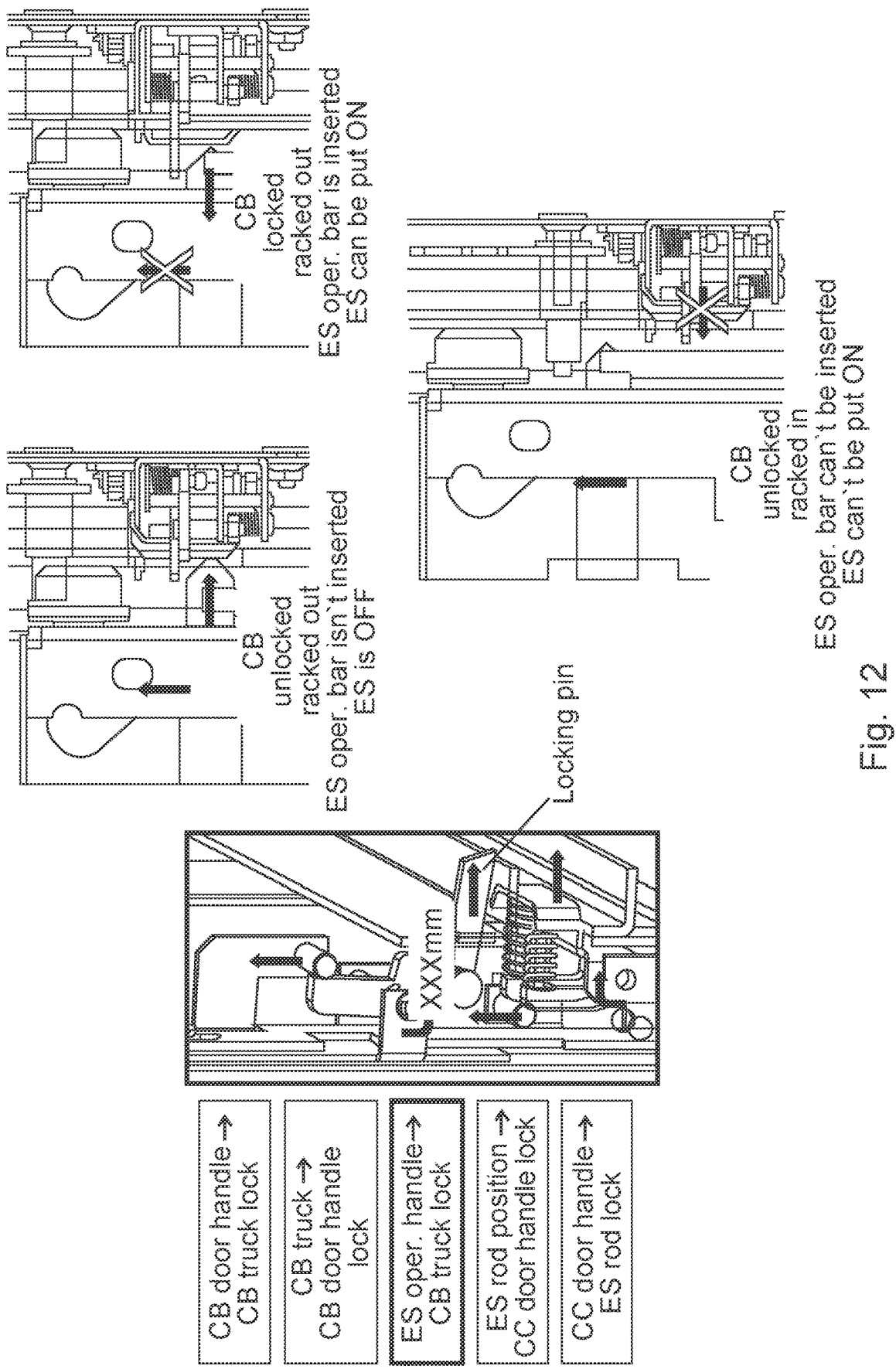

FIGS. 9-12 shows interlocking between the earthing switch (ES) operation and CB, and in effect shows the interaction between the ES operation handle or bar and the CB truck lock. FIG. 9 is an overall figure, with FIGS. 10 and 11 showing expanded portions of regions highlighted in FIG. 9 and with FIG. 12 showing representative interlock features. The interlocking between the earthing switch and circuit breaker has two functions to lock the motion of the CB if ES operation handle is inserted and to block insertion of the ES operation handle if the CB is not fully racked out from contacts. Insertion of the ES operation handle moves the lever and the vertical slider up which pushes out the locking flap and the CB is blocked. At the same time the locking pin is pushed out as well. This can happen only if the CB is racked out and not in the way of the locking pin. Otherwise the outward motion of locking pin will be blocked by the CB and the ES operation handle could not be inserted.

Figure 13:
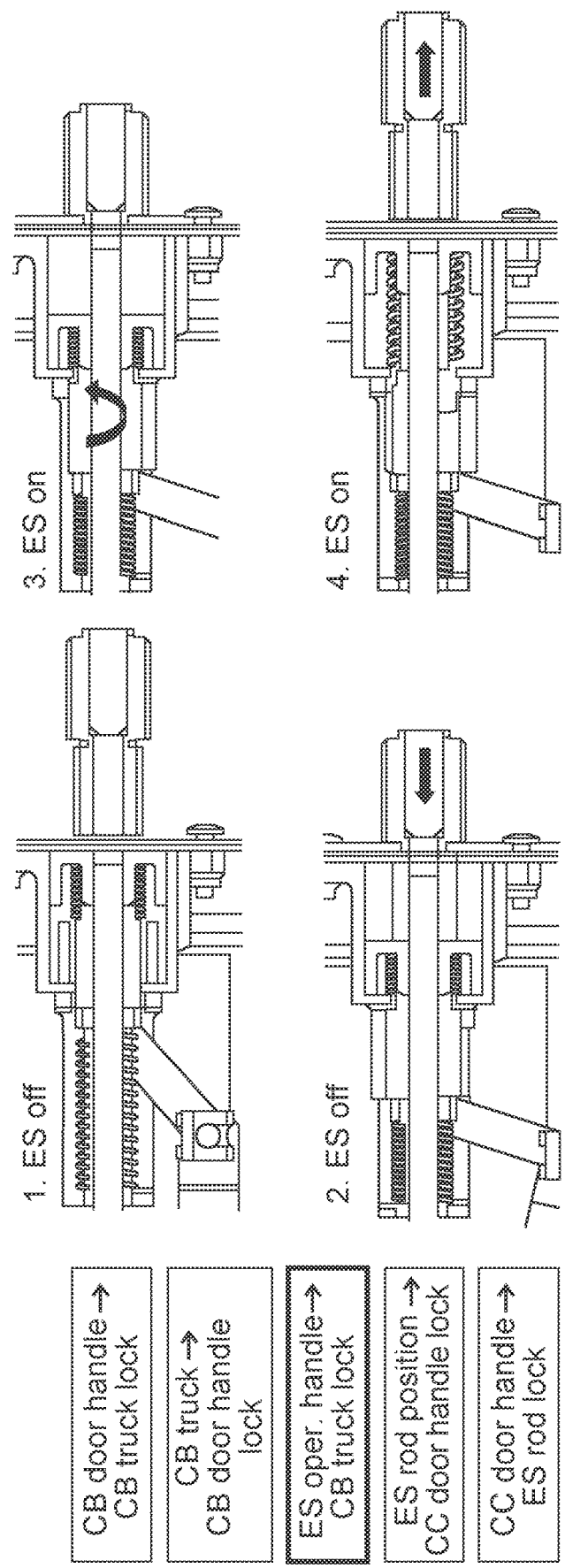
Figure 14:
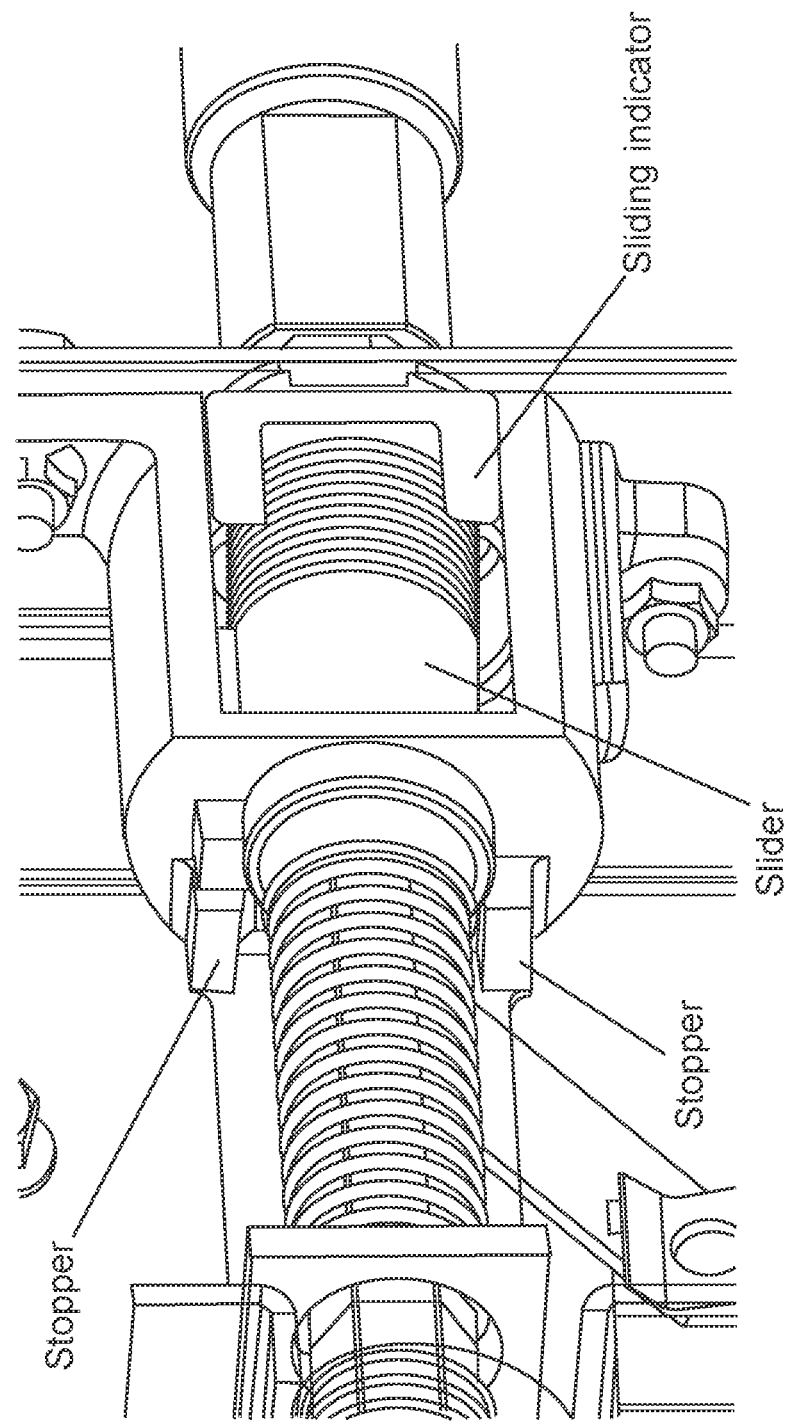
Figure 15:
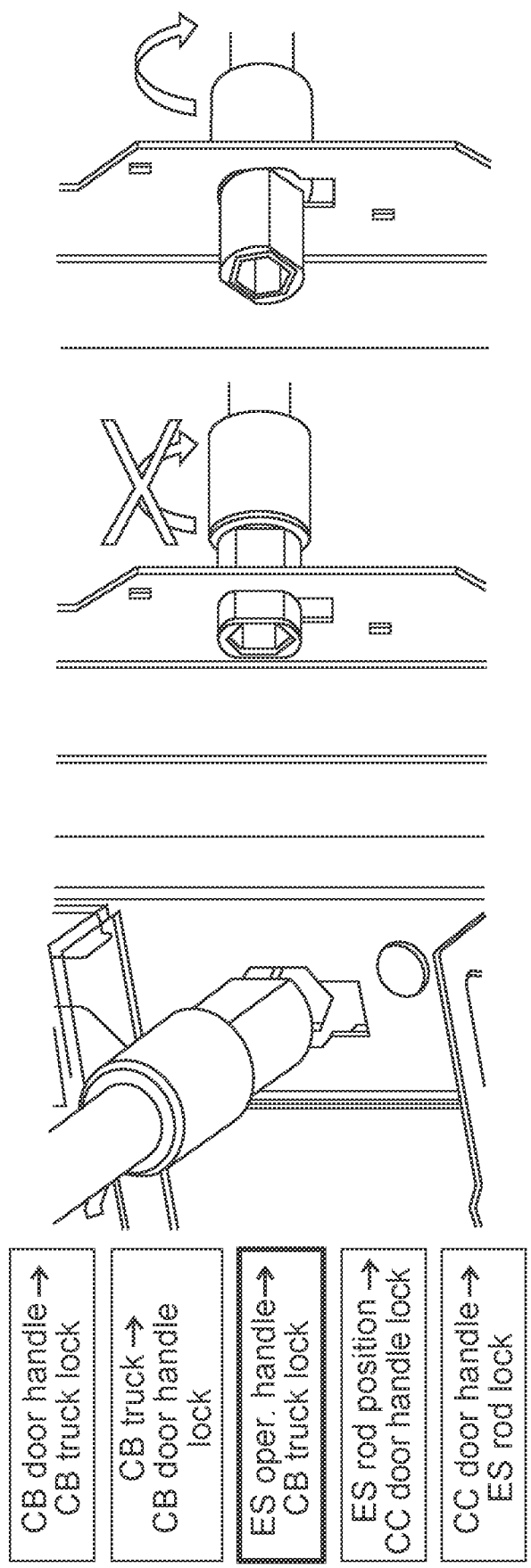

FIGS. 13 and 14 shows further details relating to the interaction between the ES operation handle or bar and the CB truck lock. shows hidden parts. As shown in image 1 of FIG. 13, the earthing switch is off and the operating lever or rod is out (also called an earthing switch operation handle or bar). As shown in image 2 of FIG. 13, an indicator and slider are pushed by inserting the operation lever and previously explained locking pin and flap are out but the ES is still off. As shown in image 3 of FIG. 13, the ES is switched on by rotating the operating lever. As shown in image 4 of FIG. 13, after removing the operating lever the slider will stay out of the housing (the interlocking is still activated and CB cannot be racked in) but the indicator will be pushed back by spring so it would be visible from outside and the status of the ES will be clear for the operator. The housing has also two stoppers that allows only correct rotation, as shown in FIG. 14. Plus the key hole on the housing allows rotation only if the operating lever is inserted sufficiently. Sufficient insertion is also covered by next key hole in the frame (as shown in FIG. 15, which shows that the operating lever has to be inserted fully before being able to be turned due to the first section having a hexagonal cross-section forward of a circular neck portion).

Figure 16:
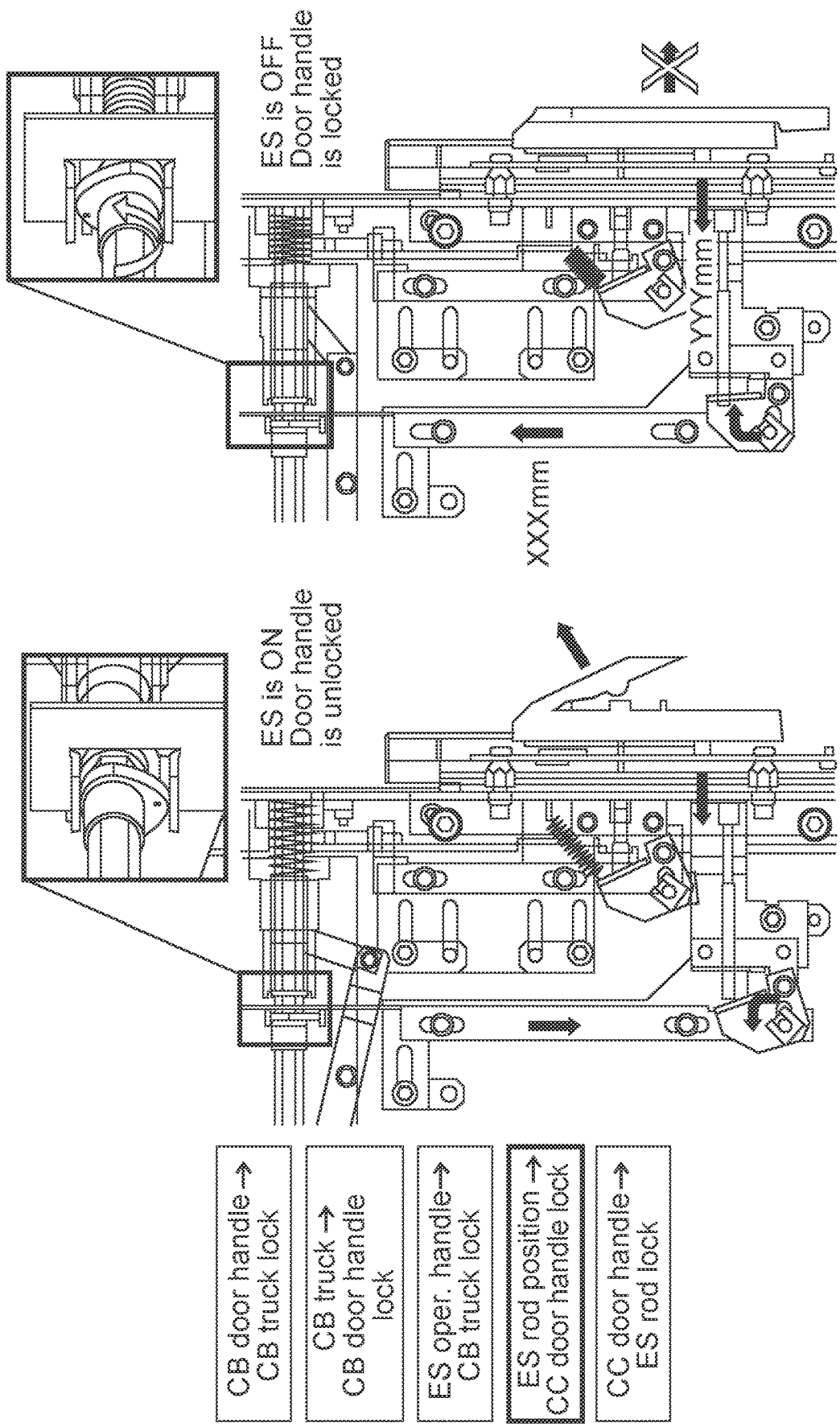

FIG. 16 shows the blocking of compartment (CC) door handle, and in effect shows interaction between the ES rod position and the CC door handle lock. This operates in effect in the same manner as for the CB door, but with different initiation. The ES is switched ON or OFF by rotation of the hexagonal shaft. On the shaft is a cam that moves a vertical slider and this is through a lever transferred to a horizontal slider which locks or unlocks the handle. In FIG. 16 the distance ""XXX mm" can for example be 8 mm, but other distances are possible, and the distance "YYY mm" can for example be 10 mm, but other distances are possible.

Figure 17:
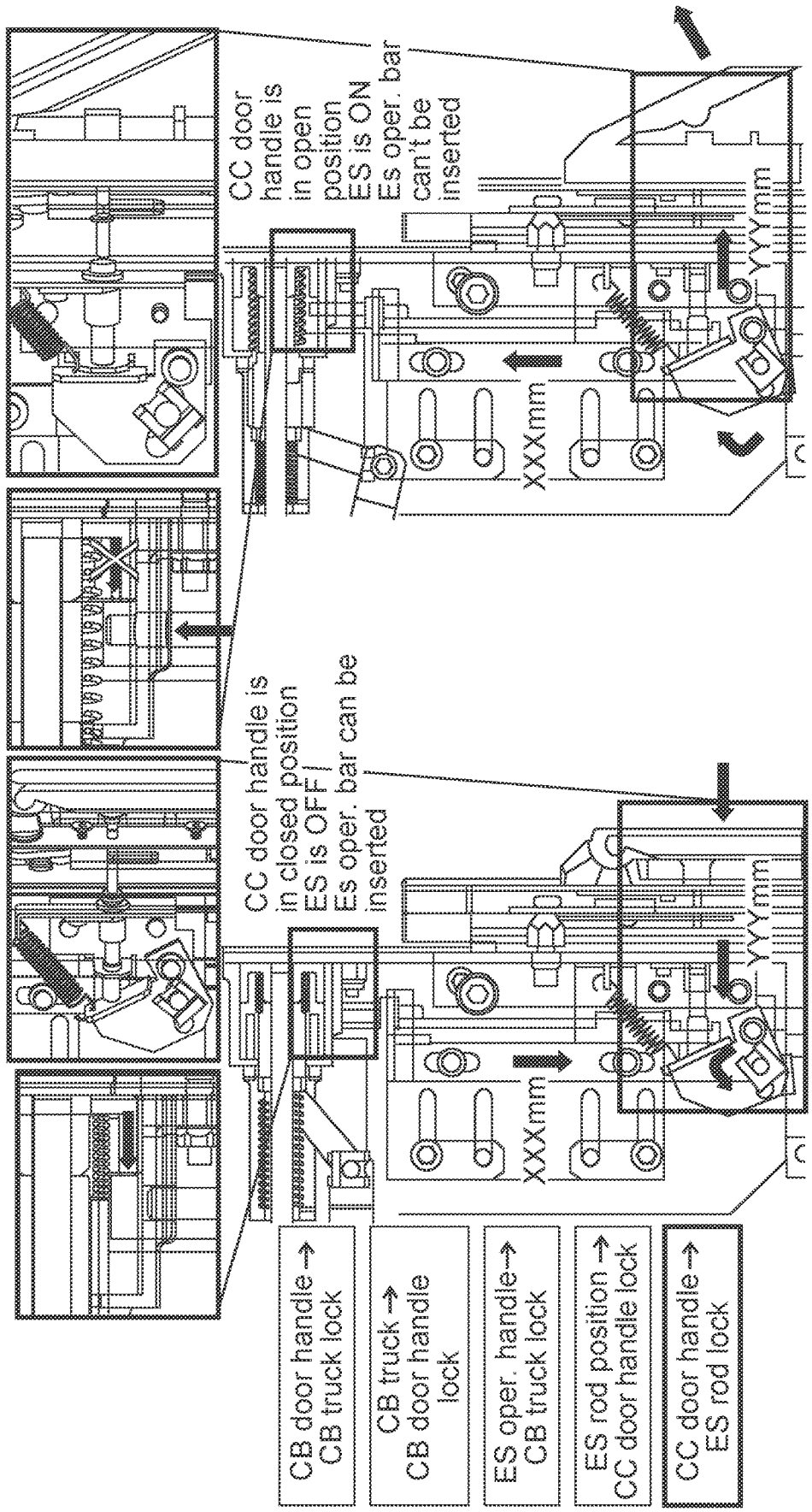
Figure 18:
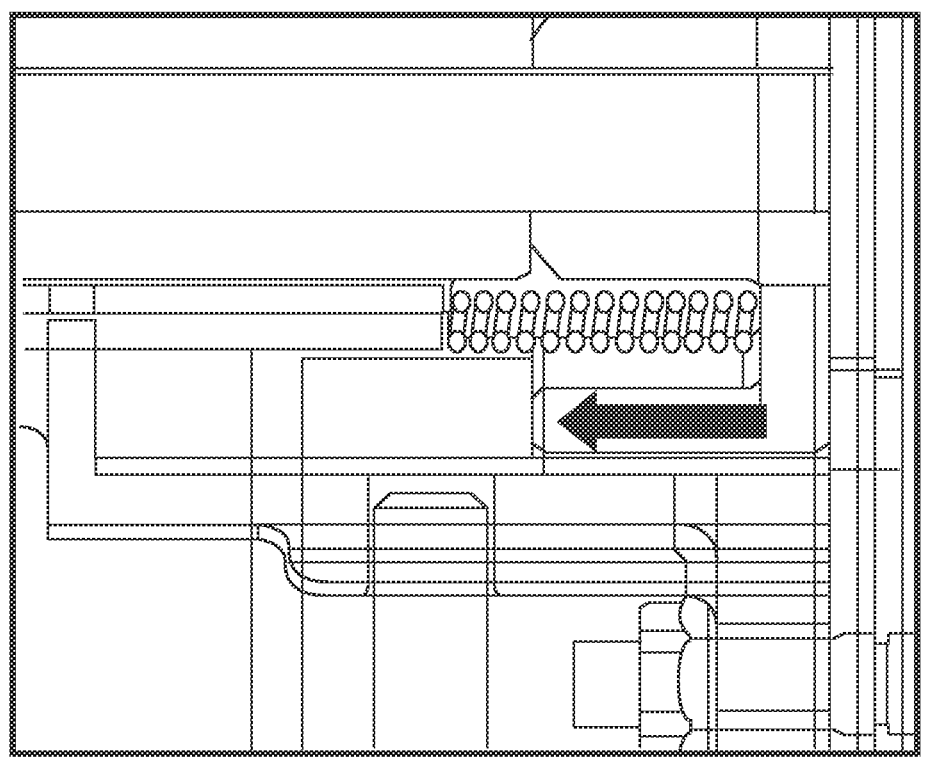
Figure 19:
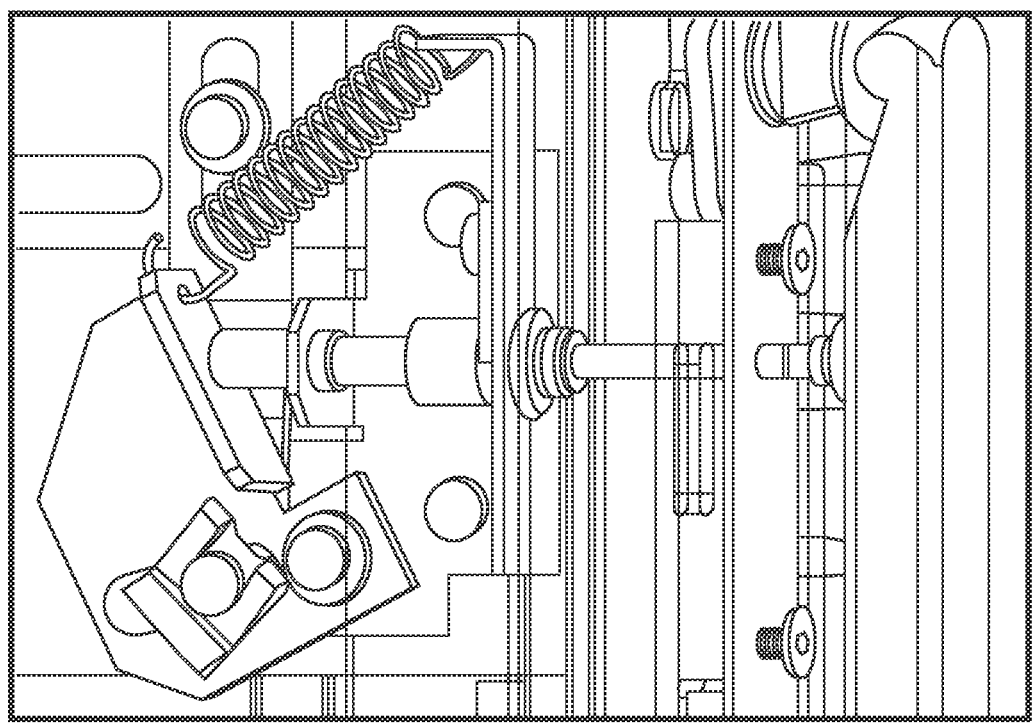
Figure 20:
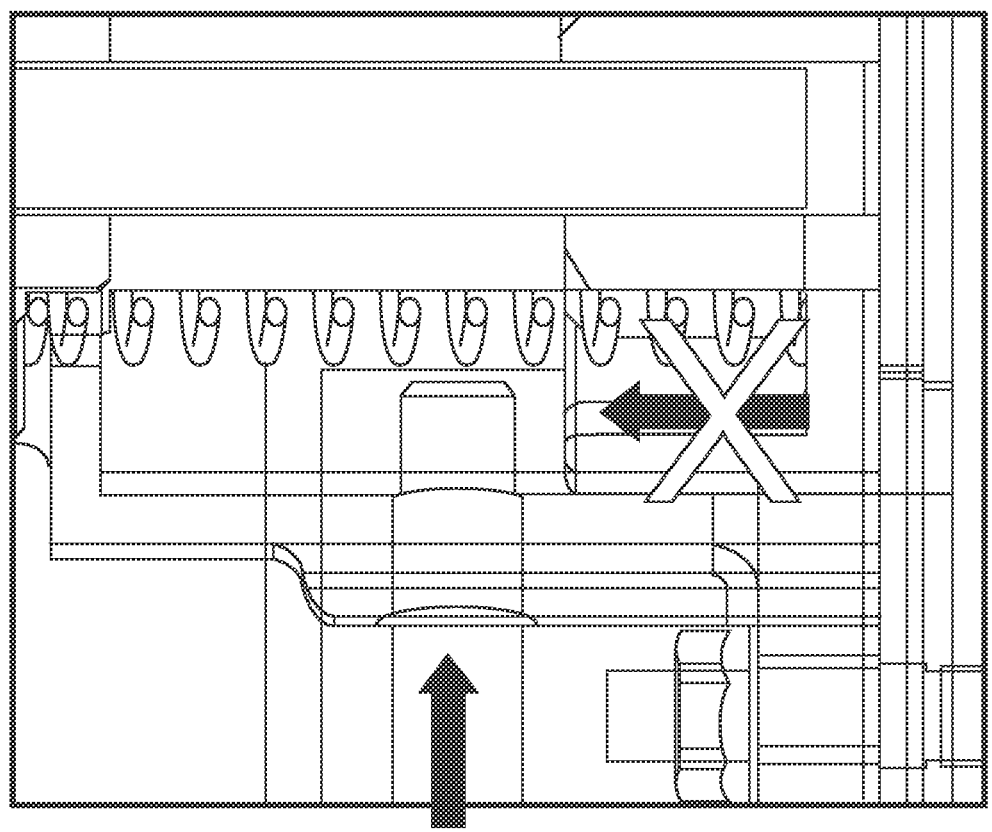
Figure 21:
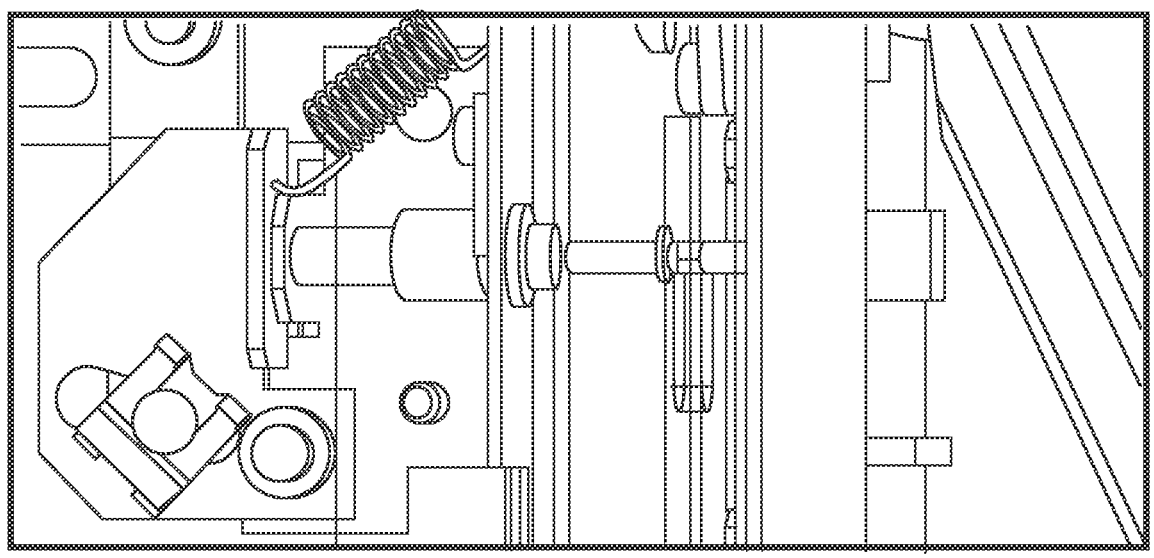

FIGS. 17-21 shows blocking the insertion of the ES operational handle that reacts again to the position of the handle. In effect shows interaction between the cable compartment (CC) door handle and the earthing switch (ES) rod lock. FIG. 17 shows an overall view, with FIGS. 18-21 showing expanded pictures of particular features shown in FIG. 17. A new feature is that the blocking pin is hidden behind a sliding indicator and because the hexagonal shaft is hidden the operational handle cannot be inserted on the shaft even partially and thus the ES can be operated.

The new interlock system and low, medium or high voltage switchgear with such an integrated interlock system prevents the dangerous situations from happening.

The interlocking system takes information from the handle and not just the door. Doors are protected against internal arc by the interlock system that has a new safety handle before the interlock can be unlocked. Also the safety handle is blocked and hidden, and excessive force can't be applied, and not just the slider inside the door. This is different to the door handle of today that is always accessible for touch and operation, even if the door is blocked.

In terms of earthing switch (ES) and circuit breaker (CB) interlocking, the new technology provides that the interlocking is activated by "insertion/activation" of the handle itself (today you need to open a shutter and then you can insert the ES operation handle). Also, a housing hides a blocking pin behind a sliding indicator that is not accessible and if activated you can't insert the ES handle—not even partially. Also there is integrated stopper for only correct rotation of the ES handle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An interlock system for a low, medium or high voltage switchgear, comprising:
   a compartment;
   a door;
   a door handle; and
   a circuit breaker,
   wherein the door is configured to permit access to an inside of the compartment,
   wherein the door handle is configured to open and close the door,
   wherein the circuit breaker is located in the compartment,
   wherein the door handle is configured to move from a closed position to an open position,
   wherein the interlock system is configured such that, when the door handle is in the closed position, the door is configured not to open, and when the door handle is in the open position, the door is configured to open,
   wherein a movement of the door handle from the closed position to the open position is configured to place the circuit breaker in a locked configuration, and wherein in the locked configuration the circuit breaker is not operational,
   wherein a movement of the door handle from the open position to the closed position is configured to place the circuit breaker in an unlocked configuration, wherein the movement of the door handle from the open position to the closed position is configured to activate a pushrod connected to a coupling system of the interlock system to enable the circuit breaker to be placed in the unlocked configuration, and wherein in the unlocked configuration the circuit breaker is operational, and
   wherein, when the door handle is in the closed position, a movement of the circuit breaker from a racked out configuration to a racked in configuration is configured to place the door handle in the locked configuration where the door handle is locked from moving from the closed position to the open position.

2. The interlock system of claim 1, wherein when the door handle is in the closed position, a movement of the circuit breaker from the racked in configuration to the racked out configuration is configured to place the door handle in the unlocked configuration where the door handle is not locked from moving from the closed position to the open position.

3. The interlock system of claim 1, wherein the switchgear comprises an earthing switch and an earthing switch operation handle or bar,
   wherein, when the earthing switch operation handle or bar is inserted, the earthing switch is configured not to operate, and when the earthing switch operation handle or bar is not inserted, the earthing switch is configured to operate,
   wherein a movement of the circuit breaker from the racked in configuration to the racked out configuration is configured to de-activate a lock, and
   wherein de-activation of the lock is configured to enable the earthing switch operation handle or bar to be inserted.

4. The interlock system of claim 3, wherein insertion of the earthing switch operation handle or bar is configured to place the circuit breaker in the locked configuration, and wherein in the locked configuration the circuit breaker is not operable.

5. The interlock system of claim 3, wherein a movement of the circuit breaker from the racked out configuration to the racked in configuration is configured to activate the lock, and wherein activation of the lock is configured to stop the earthing switch operation handle or bar from being inserted.

6. The interlock system of claim 5, wherein the movement of the circuit breaker from the racked out configuration to the racked in configuration is configured to place the circuit breaker in the unlocked configuration, and wherein in the unlocked configuration the circuit breaker is operable.

7. The interlock system of claim 3, further comprising:
   a second compartment;
   a second door; and
   a second door handle,
   wherein the second door is configured to permit access to an inside of the second compartment,
   wherein the second door handle is configured to open and close the second door,
   wherein the second door handle is configured to move from a closed position to an open position, wherein the earthing switch is configured to be transitioned to an on state through utilization of the earthing switch operation handle or bar and the earthing switch is configured to be transitioned to an off state through utilization of the earthing switch operation handle or bar, wherein, when the second door handle is in the closed position, the second door is configured not to open, and when the second door handle is in the open position, the second door is configured to open, and wherein, when the second door handle is in the closed position, a transition of the earthing switch from the on state to the off state is configured to place the second door handle in a locked configuration where the door handle is locked from moving from the closed position to the open position.

8. A low, medium or high voltage switchgear, comprising:
a compartment;
a door;
a door handle; and
a circuit breaker,
wherein the door is configured to permit access to an inside of the compartment,
wherein the door handle is configured to open and close the door,
wherein the circuit breaker is located in the compartment,
wherein the door handle is configured to move from a closed position to an open position,
wherein a movement of the door handle from the closed position to the open position is configured to place the circuit breaker in a locked configuration, and wherein in the locked configuration the circuit breaker is not operational,
wherein a movement of the door handle from the open position to the closed position is configured to place the circuit breaker in an unlocked configuration, wherein the movement of the door handle from the open position to the closed position is configured to activate a pushrod connected to a coupling system of an interlock system associated with the switchgear to enable the circuit breaker to be placed in the unlocked configuration, and wherein in the unlocked configuration the circuit breaker is operational,
wherein, when the door handle is in the closed position, a movement of the circuit breaker from a racked out configuration to a racked in configuration is configured to place the door handle in the locked configuration where it is locked from moving from the closed position to the open position, and
wherein, when the door handle is in the closed position, the door is configured not to open, and when the door handle is in the open position, the door is configured to open.

9. The switchgear of claim 8, wherein, when the door handle is in the closed position, a movement of the circuit breaker from the racked in configuration to the racked out configuration is configured to place the door handle in the unlocked configuration where the door handle is not locked from moving from the closed position to the open position.

10. The switchgear of claim 8, wherein the switchgear comprises an earthing switch and an earthing switch operation handle or bar, wherein, when the earthing switch operation handle or bar is inserted, the earthing switch is configured not to operate, and when the earthing switch operation handle or bar is not inserted, the earthing switch is configured to operate, wherein a movement of the circuit breaker from the racked in configuration to the racked out configuration is configured to de-activate a lock, and wherein de-activation of the lock is configured to enable the earthing switch operation handle or bar to be inserted.

11. The switchgear of claim 10, wherein insertion of the earthing switch operation handle or bar is configured to place the circuit breaker in the locked configuration, and wherein in the locked configuration the circuit breaker is not operable.

12. The switchgear of claim 10, wherein a movement of the circuit breaker from the racked out configuration to the racked in configuration is configured to activate the lock, and wherein activation of the lock is configured to stop the earthing switch operation handle or bar from being inserted.

13. The switchgear of claim 12, wherein the movement of the circuit breaker from the racked out configuration to the racked in configuration is configured to place the circuit breaker in the unlocked configuration, and wherein in the unlocked configuration the circuit breaker is operable.

14. The switchgear of claim 10, further comprising:
a second compartment;
a second door; and
a second door handle,
wherein the second door is configured to permit access to an inside of the second compartment,
wherein the second door handle is configured to open and close the second door,
wherein the second door handle is configured to move from a closed position to an open position,
wherein the earthing switch is configured to be transitioned to an on state through utilization of the earthing switch operation handle or bar and the earthing switch is configured to be transitioned to an off state through utilization of the earthing switch operation handle or bar,
wherein, when the second door handle is in the closed position, the second door is configured not to open, and when the second door handle is in the open position, the second door is configured to open, and
wherein, when the second door handle is in the closed position, a transition of the earthing switch from the on state to the off state is configured to place the second door handle in a locked configuration where the door handle is locked from moving from the closed position to the open position.

* * * * *